(12) United States Patent
Dupuis et al.

(10) Patent No.: US 12,522,656 B2
(45) Date of Patent: *Jan. 13, 2026

(54) ANTI-G-PROTEIN ALPHA ANTIBODY

(71) Applicant: CISBIO BIOASSAYS, Codolet (FR)

(72) Inventors: Elodie Dupuis, Caissargues (FR); Thomas Roux, Nimes (FR); Eric Trinquet, Pont-Saint-Esprit (FR)

(73) Assignee: CISBIO BIOASSAYS, Codolet (FR)

( * ) Notice: Subject to any disclaimer, the term of this patent is extended or adjusted under 35 U.S.C. 154(b) by 748 days.

This patent is subject to a terminal disclaimer.

(21) Appl. No.: 17/796,375

(22) PCT Filed: Jan. 29, 2021

(86) PCT No.: PCT/FR2021/050164
§ 371 (c)(1),
(2) Date: Jul. 29, 2022

(87) PCT Pub. No.: WO2021/152266
PCT Pub. Date: Aug. 5, 2021

(65) Prior Publication Data
US 2023/0091315 A1 Mar. 23, 2023

(30) Foreign Application Priority Data
Jan. 30, 2020 (FR) ........................... 2000923

(51) Int. Cl.
*C07K 16/28* (2006.01)
*C12N 15/63* (2006.01)
*G01N 33/53* (2006.01)

(52) U.S. Cl.
CPC .............. *C07K 16/28* (2013.01); *C12N 15/63* (2013.01); *G01N 33/53* (2013.01); *C07K 2317/565* (2013.01); *G01N 2333/4719* (2013.01); *G01N 2333/726* (2013.01)

(58) Field of Classification Search
None
See application file for complete search history.

(56) References Cited

FOREIGN PATENT DOCUMENTS

| WO | 2014201557 A1 | 12/2014 |
| WO | 2019020964 A1 | 1/2019 |

OTHER PUBLICATIONS

International Search Report (English Translation) for International Application No. PCT/FR2021/050164 mailed on May 19, 2021, 4 pages.
Search Report for French Patent Application No. 2000923 dated Sep. 24, 2020, 5 pages.
Bissinger et al., "Blunted apoptosis of erythrocytes in mice deficient in the heterotrimeric G-protein subunit Gαi2," Scientific Reports, vol. 6, No. 1, 2016, 10 pages.
Bähme et al., "Illuminating the life of GPCRs," Cell Communication and Signaling, vol. 7, No. 1, 2009, p. 1-22.
Pérez De La Lastra et al. "Epitope mapping of 10 monoclonal antibodies against the pig analogue of human membrane cofactor protein (MCP)," Immunology, vol. 96, No. 4, 1999, p. 663-670.
Strange et al., "Use of the GTPγS ([35S]GTPγS and Eu- GTPγS) binding assay for analysis of ligand potency and efficacy at G protein-coupled receptors," British Journal of Pharmacology, vol. 161, No. 6, 2010, p. 1238-1249.
Streit et al., "Cardiac Effects of Attenuating Gsα—Dependent Signaling," PLOS One, vol. 11, No. 1, 2016, p. 1-19.
Takahashi et al., "Identification of residues crucial for the interaction between human neuroglobin and the α-subunit of heterotrimeric Gi protein," Scientific Reports, vol. 6, No. 1, 2016, 10 pages.
Touhara et al., "Molecular basis of signaling specificity between GIRK channels and GPCRs," eLIFE, 2018, p. 1-23.
Van Eps et al., "Gi- and Gs-coupled GPCRs show different modes of G-protein binding," Proceedings of the National Academy of Sciences (PNAS), vol. 115, No. 10, 2018, p. 2383-2388.
Van Unen et al., "A New Generation of FRET Sensors for Robust Measurement of Gαi1, Gαi2 and Gαi3 Activation Kinetics in Single Cells," PLOS One, vol. 11, No. 1, 2016, p. 1-14.

*Primary Examiner* — Ruixiang Li
(74) *Attorney, Agent, or Firm* — MH2 Technology Law Group, LLP

(57) ABSTRACT

The invention relates to antibodies or antibody fragments capable of binding to G-protein alpha, nucleic acid sequences coding for the antibody, vectors comprising the nucleic acid sequence, cells comprising the vector or the nucleic acid sequence and a kit-of-parts comprising (i) the antibody or antibody fragment or the composition and (ii) a source of GTP labeled with a member of a pair of RET partners.

18 Claims, 21 Drawing Sheets

Specification includes a Sequence Listing.

Specific FRET signal between G-GRP-Donor and Ac DSV36S-Acceptor

■ Nonspecific Signal (Excess of unlabeled GTPgS)
▨ Total Signal

Total Signal / Nonspecific Signal = 4.7

Specific FRET signal between
G-GRP-Donor and Ac DSV36S-Acceptor

▨ Nonspecific Signal (Excess of unlabeled GTPgS)
▨ Total Signal

Total Signal / Nonspecific Signal = 2.1

GTPgN-octyl-C2     Ac DSV38S-d2

**Specific FRET signal between
G-GRP-Donor and Ac DSV36S-Acceptor**

▓ Nonspecific Signal (Excess of unlabeled GTPgS)
▓ Total Signal

Total Signal / Nonspecific Signal = 1.6

GTPgN-octyl-C2     Ac DSV38S-d2

**Modulation of the FRET signal
by an agonist**

▓ Nonspecific Signal (Excess of unlabeled GTPgS)
▓ Vehicle
■ Agonist (SNC162 - 10µM)

Specific FRET signal between G-GRP-Donor and Ac DSV36S-Acceptor

- Nonspecific Signal (Excess of unlabeled GTPgS)
- Total Signal

Total Signal / Nonspecific Signal = 1.6

Modulation of the FRET signal by an agonist

- Nonspecific Signal (Excess of unlabeled GTPgS)
- Vehicle
- Agonist (SNC162 - 10μM)

**Specific FRET signal
between G-GRP-Donor and Ac DSV36S-Acceptor**

▨ Nonspecific Signal (Excess of unlabeled GTPgS)
▨ Total Signal

Total Signal / Nonspecific Signal = 1.4

**Modulation of the FRET signal
by an agonist**

▨ Nonspecific Signal (Excess of unlabeled GTPgS)
▨ Vehicle
▨ Agonist (SNC162 - 10μM)

**Specific FRET signal
between G-GRP-Donor and Ac DSV36S-Acceptor**

▨ Nonspecific Signal (Excess of unlabeled GTPgS)
▨ Total Signal

Total Signal / Nonspecific Signal = 2.6

**Modulation of the FRET signal
by an agonist**

▨ Nonspecific Signal (Excess of unlabeled GTPgS)
▨ Vehicle
▉ Agonist (SNC162 - 10µM)

**Specific FRET signal
between G-GRP-Donor and Ac DSV36S-Acceptor**

▨ Nonspecific Signal (Excess of unlabeled GTPgS)
▨ Total Signal

Total Signal / Nonspecific Signal = 3.8

**Modulation of the FRET signal
by an agonist**

▨ Nonspecific Signal (Excess of unlabeled GTPgS)
▨ Vehicle
▪ Agonist (SNC162 - 10µM)

**Specific FRET signal
between G-GRP-Donor and Ac DSV36S-Acceptor**

▇ Nonspecific Signal (Excess of unlabeled GTPgS)
▨ Total Signal

Total Signal / Nonspecific Signal = 3

**Modulation of the FRET signal
by an agonist**

▇ Nonspecific Signal (Excess of unlabeled GTPgS)
▨ Vehicle
■ Agonist (SNC162 - 10µM)

**Specific FRET signal
between G-GRP-Donor and Ac DSV36S-Acceptor**

■ Nonspecific Signal (Excess of unlabeled GTPgS)
■ Total Signal

Total Signal / Nonspecific Signal = 1.9

**Modulation of the FRET signal
by an agonist**

■ Nonspecific Signal (Excess of unlabeled GTPgS)
■ Vehicle
■ Agonist (SNC162 - 10μM)

Specific FRET signal between G-GRP-Donor and Ac DSV36S-Acceptor

▩ Nonspecific Signal (Excess of unlabeled GTPgS)

▩ Total Signal

Total Signal / Nonspecific Signal = 3.4

Modulation of the FRET signal by an agonist

▩ Nonspecific Signal (Excess of unlabeled GTPgS)

▩ Vehicle

■ Agonist (SNC162 - 10µM)

**Specific FRET signal
between G-GRP-Donor and Ac DSV36S-Acceptor**

■ Nonspecific Signal (Excess of unlabeled GTPgS)
▩ Total Signal

Total Signal / Nonspecific Signal = 5.9

**Modulation of the FRET signal
by an agonist**

■ Nonspecific Signal (Excess of unlabeled GTPgS)
▩ Vehicle
■ Agonist (SNC162 - 10μM)

Specific FRET signal between G-GRP-Donor and Ac DSV36S-Acceptor

- Nonspecific Signal (Excess of unlabeled GTPgS)
- Total Signal

Total Signal / Nonspecific Signal = 2.2

Modulation of the FRET signal by an agonist

- Nonspecific Signal (Excess of unlabeled GTPgS)
- Vehicle
- Agonist (SNC162 - 10µM)

ANTI-G-PROTEIN ALPHA ANTIBODY

CROSS REFERENCE TO RELATED APPLICATIONS

This application is the U.S. National Phase of PCT International Application No. PCT/FR2021/050164, filed on Jan. 29, 2021, which claims priority to French Patent Application No. FR2000923, filed on Jan. 30, 2020, the entire disclosures of which are hereby incorporated by reference in their entireties.

SEQUENCE LISTING

The instant application contains a Sequence Listing which has been submitted electronically in ASCII format and is hereby incorporated by reference in its entirety. Said ASCII copy, created on 29 Jul. 2022, is named 0177_0193_ST25.txt and is 5,692 bytes in size.

TECHNICAL FIELD

The present invention relates to novel antibodies or antibody fragments, capable of binding to G-protein alpha.

PRIOR ART

The G-protein-coupled receptors (GPCR) are a family of membrane receptors in mammals and in the whole animal kingdom. The G-proteins are heterotrimeric proteins (3 subunits: alpha, beta and gamma) that are activated by the GPCRs. Via the GPCRs, the G-proteins have a role of signal transduction from the exterior of the cell to the interior of the cell (i.e. cellular response to an external stimulus). Their mechanism of action commonly described is summarized hereunder:
- in its inactive, resting state, the alpha subunit of the G-protein is bound to the nucleotide GDP (full G-protein bound to GDP);
- after activation of the GPCR, the latter binds to the alpha subunit of the G-protein and triggers a process of activation of the G-protein consisting of two steps: 1) export of the GDP from the G-protein to give an empty G-protein, and formation of an inactive GPCR/empty-G-protein complex, and 2) fixation of GTP, which leads to formation of an active G-protein, in the GTP form (full G-protein bound to GTP). In the first step, the receptor-bound G-protein is in a form called "empty form". This state is described in the literature as being transient, since it is described that the nucleotide GTP binds rapidly to the alpha subunit of the G-protein. Moreover, the beta/gamma subunits of the activated G-protein dissociate from the alpha subunit;
- the alpha subunit of the full G-protein bound to GTP then binds to the effectors to activate them. In their turn, the effectors activate signaling pathways, leading to a cellular response;
- GTP is then hydrolyzed to GDP by the alpha subunit of the G-protein and the alpha subunit recombines with the beta/gamma subunit to re-form the full G-protein bound to GDP (inactive state).

In view of the involvement of GPCRs in numerous signaling pathways, tools have been generated in the prior art for studying their activity, often with the aim of identifying new ligands of these receptors having potential therapeutic activity. As an example of these tools, we may mention the use of a nonhydrolyzable or slowly hydrolyzable radioactive derivative of GTP, in particular GTP-gamma-S, which binds to G-protein alpha when the receptor is activated. There are also recombinant systems based on measurement of an enzymatic activity such as luciferase, expression of which is controlled by the second messengers produced by activation of the receptor. Antibodies have also been synthesized for detecting activation of GPCRs at the level of the cell surface [1]. Reference may also be made to patent EP2723764 81, which proposes nano-antibodies that bind to the interface between G-protein alpha and G-protein beta/gamma, allowing the GPCR/G-protein complex to be stabilized.

However, the prior art does not describe antibodies or antibody fragments capable of generating a RET signal when it is labeled with a member of a pair of RET partners and used with a GTP labeled with a member of a pair of RET partners.

The inventors have developed antibodies or antibody fragments for detecting activation of a GPCR by carrying out a RET method that uses a GTP labeled with a member of a pair of RET partners. The inventors have also shown that these antibodies or fragments of antibodies have these properties as they are capable of binding to G-protein alpha in a very particular zone.

SUMMARY OF THE INVENTION

A first object of the present invention relates to an antibody or an antibody fragment capable of binding to G-protein alpha, which comprises:
- a heavy chain variable domain comprising a CDR1 of amino acid sequence SEQ ID NO: 1, a CDR2 of amino acid sequence SEQ ID NO: 2, and a CDR3 of amino acid sequence SEQ ID NO: 3, and
- a light chain variable domain comprising a CDR1 of amino acid sequence SEQ ID NO: 4, a CDR2 of amino acid sequence DTS (i.e. the three amino acids Asp Thr Ser), and a CDR3 of amino acid sequence SEQ ID NO: 5.

A second object of the present invention relates to an antibody or an antibody fragment that competes for binding to G-protein alpha with the antibody or antibody fragment of the first object of the invention.

A third object of the present invention relates to a composition comprising the antibody or antibody fragment according to the invention.

A fourth object of the present invention relates to a kit-of-parts comprising (i) the antibody or the antibody fragment according to the invention or the composition according to the invention and (ii) a source of GTP labeled with a member of a pair of RET partners.

A fifth object of the present invention relates to a nucleic acid sequence coding for the antibody or the antibody fragment according to the invention.

A sixth object of the present invention relates to a vector comprising the nucleic acid sequence according to the invention.

A seventh object of the present invention relates to a cell comprising the vector according to the invention or the nucleic acid sequence according to the invention.

DETAILED DESCRIPTION

Definitions

The terms "anti-G-protein alpha antibody", "anti-G alpha antibody" or "antibodies capable of binding to G-protein alpha" (or antibody fragment) are interchangeable and denote an antibody (or an antibody fragment) that binds to G-protein alpha with a sufficient affinity for being used as an agent for detection (e.g. for carrying out a RET), diagnosis and/or therapy by targeting G-protein alpha.

The term "antibody", also called "immunoglobulin", denotes a heterotetramer consisting of two heavy chains of about 50-70 kDa each (called H chains for Heavy) and two light chains of about 25 kDa each (called L chains for Light), bound together by intrachain and interchain disulfide bonds. Each chain consists, in the N-terminal position, of a variable region or domain, called VL for the light chain, VH for the heavy chain, and at a C-terminal position, of a constant region, consisting of a single domain called CL for the light chain and of three or four domains called CH1, CH2, CH3, CH4, for the heavy chain. Each variable domain generally comprises 4 "hinge regions" (called FR1, FR2, FR3, FR4) and 3 regions directly responsible for binding to the antigen, called "CDR" (designated CDR1, CDR2, CDR3). The antibody may be, for example, a mammalian antibody, such as a murine antibody, a chimeric antibody, a humanized antibody or a human antibody.

"Chimeric antibody" means an antibody whose sequences of the variable regions of the light chains and of the heavy chains belong to a species different from that of the sequences of constant regions of the light chains and of the heavy chains. For the purposes of the invention, the sequences of the variable regions of the heavy and light chains are preferably of murine origin whereas the sequences of the constant regions of the heavy and light chains belong to a nonmurine species. In this respect, for the constant regions, all the species of nonmurine mammals are usable, and in particular human, monkey, Old-World swine (Suidae), bovines, equines, felines, canines or birds, this list not being exhaustive. Preferably, the chimeric antibodies according to the invention contain sequences of constant regions of the heavy and light chains of human origin and the sequences of variable regions of the heavy and light chains of murine origin.

"Humanized antibody" means an antibody of which all or part of the sequences of the regions involved in recognition of the antigen (the hypervariable regions or CDR: Complementarity Determining Region) and sometimes certain amino acids of the FR regions (Framework regions) are of nonhuman origin whereas the sequences of the constant regions and of the variable regions not involved in recognition of the antigen are of human origin.

"Human antibody" means an antibody containing only human sequences, both for the variable and constant regions of the light chains and for the variable and constant regions of the heavy chains.

"Antibody fragment" means any part of an immunoglobulin obtained by enzymatic digestion or obtained by bioproduction comprising at least one disulfide bond and that is capable of binding to the antigen recognized by the whole antibody, for example Fab, Fab', F(ab')$_2$, Fab'-SH. Enzymatic digestion of the immunoglobulins by papain generates two identical fragments, which are called Fab (Fragment antigen binding) fragments, and a fragment Fc (Crystallizable fragment). Enzymatic digestion of the immunoglobulins by pepsin generates a fragment F(ab')$_2$ and a fragment Fc split into several peptides. F(ab')$_2$ is formed from two Fab' fragments bound by interchain disulfide bonds. The Fab parts consist of the variable regions and the CH1 and CL domains. The Fab' fragment consists of the Fab region and a hinge region. Fab'-SH refers to a Fab' fragment in which the cysteine residue of the hinge region bears a free thiol group.

The term "affinity" refers to the force of all the noncovalent interactions between a molecule, for example an antibody or an antibody fragment and the recognized antigen, for example an antigen such as G-protein alpha. Affinity is generally represented by the dissociation constant (Kd). The dissociation constant (Kd) can be measured by well-known methods, for example by FRET or SPR.

In the sense of the present invention, "identity" or "homology" is calculated by comparing two sequences aligned in a comparison window. Alignment of the sequences makes it possible to determine the number of positions (nucleotides or amino acids) in common for the two sequences in the comparison window. The number of positions in common is therefore divided by the total number of positions in the comparison window and multiplied by 100 to obtain the percentage identity. Determination of the percentage sequence identity can be carried out manually or using well-known software.

In a particular embodiment of the invention, identity or homology corresponds to at least one substitution, for example 1, 2, 3, 4, 5, 6, 7, 8, 9, 10 substitutions, of an amino acid residue, preferably at least one substitution of an amino acid residue performed conservatively. "Substitution of an amino acid residue performed conservatively" consists of replacing an amino acid residue with another amino acid residue having a side chain possessing similar properties. The families of amino acids possessing side chains with similar properties are well known; we may mention for example basic side chains (e.g. lysine, arginine, histidine), acid side chains (e.g. aspartic acid, glutamic acid), uncharged polar side chains (e.g. glycine, asparagine, glutamine, serine, threonine, tyrosine, cysteine), nonpolar side chains (e.g. glycine, cysteine, alanine, valine, leucine, isoleucine, proline, phenylalanine, methionine, tryptophan), beta-branched side chains (e.g. threonine, valine, isoleucine) and aromatic side chains (e.g. tyrosine, phenylalanine, tryptophan, histidine).

Homologous antibodies or antibody fragments or "variants of antibodies or antibody fragments" (i.e. antibodies or antibody fragments having the same function) therefore possess certain amino acids that may be substituted with other amino acids at the level of the constant regions and/or variable regions, without losing the capacity for binding to the antigen. It is preferable for this substitution to be performed within the DNA sequence that codes for the antibody or the antibody fragment, i.e. the substitution is conservative in nature. A person skilled in the art applies his general knowledge for determining the number of substitutions that may be carried out and their localization in order to preserve the function of the antibody or antibody fragment. In order to determine the capacity of one or more variants of an antibody or antibody fragment for binding specifically to an antigen, several suitable methods, familiar to a person skilled in the art and described in the prior art, may be used. The antibodies or the antibody fragments can therefore be assayed by binding techniques, for example such as ELISA, the technique of affinity chromatography, etc. The variants of antibodies or of antibody fragments can be generated for example by the "phage display" method, allowing a phage library to be generated. A large number of methods are known for generating a "phage display" library and targeting the variants of antibodies or of antibody fragments having the required functional characteristics.

"Purified" and "isolated" means, referring to an antibody or an antibody fragment according to the invention, that the antibody is present in the substantial absence of other biological macromolecules of the same type. The term "purified" as used here preferably signifies at least 75 wt %, more preferably at least 85 wt %, even more preferably at least 95 wt %, and most preferably at least 98 wt % of antibodies, relative to all of the macromolecules present.

The term "G-protein" denotes a heterotrimeric protein made up of three subunits called G-protein alpha, G-protein beta and G-protein gamma.

The term "G-protein alpha" or "G alpha" denotes the alpha subunit of the G-protein. G-protein alpha possesses two domains, the GTPase domain, and the alpha helix domain. There are at least 20 different G-proteins alpha, which may be classed among the following main families of proteins: G alphas (known to activate adenylate cyclase to increase synthesis of cAMP), G alphai (known to inhibit adenylate cyclase), G alphaolf (associated with the olfactory receptors), G alphat (known for transduction of the visual signals in the retina in conjunction with rhodopsin), G alphaq (known to stimulate phospholipase C) or the G alpha12/13 family (known to regulate the cytoskeleton, the cellular junctions, and other processes linked to the movement of the cell). The G-protein alpha may be selected from G-protein alphai, G-protein alphao and/or G-protein alphaz. The G-protein alphai may be selected from G-protein alphai1, G-protein alphai2 and G-protein alphai3. The G-protein alphai may be of human or animal origin.

Advantageously, the antibody or antibody fragment according to the invention binds to G-protein alphai, G-protein alphao and/or G-protein alphaz, for example it binds to G-protein alphai1, to G-protein alphai2 and/or to G-protein alphai3. The G-protein alphai1 of human origin bears the identifier UniProt P63096-1 for isoform 1 and the identifier UniProt P63096-2 for isoform 2. The gene coding for G-protein alphai1 of human origin is known by the name "GNAI1" (Gene ID: 2770, NCBI).

The term "GTP" denotes guanosine triphosphate.

The term "non-hydrolyzable or slowly hydrolyzable GTP" denotes a GTP analog that is not hydrolyzed or is little hydrolyzed to GDP. We may mention for example GTP-gammaS (CAS No. 37589-80-3), GppNHp (CAS No. 148892-91-5) or GppCp (CAS No. 10470-57-2).

The terms "non-hydrolyzable or slowly hydrolyzable GTP labeled with a member of a pair of RET partners" or "labeled nonhydrolyzable or slowly hydrolyzable GTP" are interchangeable and denote either a nonhydrolyzable or slowly hydrolyzable GTP labeled with a member of a donor pair of RET partners ("GTP-donor"), or a nonhydrolyzable or slowly hydrolyzable GTP labeled with a member of an acceptor pair of RET partners ("GTP-acceptor").

The term "RET" (is the abbreviation for Resonance Energy Transfer) denotes energy transfer techniques, including FRET and BRET.

The term "FRET" (is the abbreviation for Fluorescence Resonance Energy Transfer) denotes energy transfer between two fluorescent molecules. FRET is defined as a nonradiative energy transfer resulting from dipole—dipole interaction between an energy donor and an energy acceptor. This physical phenomenon requires an energy compatibility between these molecules. This signifies that the emission spectrum of the donor must overlap, at least partially, the absorption spectrum of the acceptor. In accordance with Förster's theory, FRET is a process that depends on the distance separating the two molecules, donor and acceptor: when these molecules are close to one another, a FRET signal will be emitted. For example, the dissociation constant (Kd) between an antibody and its target can be measured by FRET, for example as described in the examples.

The term "BRET" (is the abbreviation for Bioluminescence Resonance Energy Transfer) denotes energy transfer between a bioluminescent molecule and a fluorescent molecule.

Antibody or Antibody Fragment According to the Invention

A first object of the invention relates to an antibody or an antibody fragment capable of binding to G-protein alpha, which comprises:
  a heavy chain variable domain comprising a CDR1 of amino acid sequence SEQ ID NO: 1, a CDR2 of amino acid sequence SEQ ID NO: 2, and a CDR3 of amino acid sequence SEQ ID NO: 3, and
  a light chain variable domain comprising a CDR1 of amino acid sequence SEQ ID NO: 4, a CDR2 of amino acid sequence DTS (i.e. the three amino acids "Asp Thr Ser", i.e. the three amino acids aspartic acid, threonine and serine), and a CDR3 of amino acid sequence SEQ ID NO: 5.

The heavy chain variable domain may comprise:
  an FR1 having at least 80% homology, preferably at least 90% homology, for example at least 95% homology, at least 96%, at least 97%, at least 98%, at least 99% or even 100% homology with the amino acid sequence SEQ ID NO: 6,
  an FR2 having at least 80% homology, preferably at least 90% homology, for example at least 95% homology, at least 96%, at least 97%, at least 98%, at least 99% or even 100% homology with the amino acid sequence SEQ ID NO: 7,
  an FR3 having at least 80% homology, preferably at least 90% homology, for example at least 95% homology, at least 96%, at least 97%, at least 98%, at least 99% or even 100% homology with the amino acid sequence SEQ ID NO: 8, and/or
  an FR4 having at least 80% homology, preferably at least 90% homology, for example at least 95% homology, at least 96%, at least 97%, at least 98%, at least 99% or even 100% homology with the amino acid sequence SEQ ID NO: 9.

The light chain variable domain may comprise:
  an FR1 having at least 80% homology, preferably at least 90% homology, for example at least 95% homology, at least 96%, at least 97%, at least 98%, at least 99% or even 100% homology with the amino acid sequence SEQ ID NO: 10,
  an FR2 having at least 80% homology, preferably at least 90% homology, for example at least 95% homology, at least 96%, at least 97%, at least 98%, at least 99% or even 100% homology with the amino acid sequence SEQ ID NO: 11,
  an FR3 having at least 80% homology, preferably at least 90% homology, for example at least 95% homology, at least 96%, at least 97%, at least 98%, at least 99% or even 100% homology with the amino acid sequence SEQ ID NO: 12, and/or
  an FR4 having at least 80% homology, preferably at least 90% homology, for example at least 95% homology, at least 96%, at least 97%, at least 98%, at least 99% or even 100% homology with the amino acid sequence SEQ ID NO: 13.

In a particular embodiment of the antibody according to the invention:
the heavy chain variable domain comprises:
an FR1 of amino acid sequence SEQ ID NO: 6 (i.e. 100% homology with the amino acid sequence SEQ ID NO: 6),
an FR2 of amino acid sequence SEQ ID NO: 7,
an FR3 of amino acid sequence SEQ ID NO: 8, and
an FR4 of amino acid sequence SEQ ID NO: 9; and
the light chain variable domain comprises:
an FR1 of amino acid sequence SEQ ID NO: 10,
an FR2 of amino acid sequence SEQ ID NO: 11,
an FR3 of amino acid sequence SEQ ID NO: 12, and
an FR4 of amino acid sequence SEQ ID NO: 13.

In a particular embodiment of the antibody according to the invention, the heavy chain variable domain may have at least 80% homology, preferably at least 90% homology, for example at least 95% homology, at least 96%, at least 97%, at least 98%, at least 99% or 100% homology with the amino acid sequence SEQ ID NO: 14, and the light chain variable domain may have at least 80% homology, preferably at least 90% homology, for example at least 95% homology, at least 96%, at least 97%, at least 98%, at least 99% or 100% homology with the amino acid sequence SEQ ID NO: 15.

Thus, the invention relates to an antibody or antibody fragment in which:
the heavy chain variable domain has at least 80% homology, preferably at least 90% homology, for example at least 95% homology, at least 96%, at least 97%, at least 98%, at least 99% or 100% homology with the amino acid sequence SEQ ID NO: 14;
the light chain variable domain has at least 80% homology, preferably at least 90% homology, for example at least 95% homology, at least 96%, at least 97%, at least 98%, at least 99% or 100% homology with the amino acid sequence SEQ ID NO: 15; and
CDR1 of the heavy chain variable domain consists of the amino acid sequence SEQ ID NO: 1, CDR2 of the heavy chain variable domain consists of the amino acid sequence SEQ ID NO: 2, CDR3 of the heavy chain variable domain consists of the amino acid sequence SEQ ID NO: 3, CDR1 of the light chain variable domain consists of the amino acid sequence SEQ ID NO: 4, CDR2 of the light chain variable domain consists of the amino acid sequence DTS, and CDR3 of the light chain variable domain consists of the amino acid sequence SEQ ID NO: 5.

Advantageously, the heavy chain variable domain consists of the amino acid sequence SEQ ID NO: 14 (i.e. the heavy chain variable domain has 100% homology with the amino acid sequence SEQ ID NO: 14) and the light chain variable domain consists of the amino acid sequence SEQ ID NO: 15.

The antibody described in the examples under the reference DSV36S comprises a heavy chain variable domain that consists of the amino acid sequence SEQ ID NO: 14 and a light chain variable domain that consists of the amino acid sequence SEQ ID NO: 15.

The antibody or antibody fragment according to the first object described above is called "reference antibody or antibody fragment" hereinafter.

A second object of the invention relates to an antibody or an antibody fragment that competes for binding to G-protein alpha with the reference antibody or antibody fragment, hereinafter "competing antibody or antibody fragment".

The capacity of an antibody or of an antibody fragment for competing with the reference antibody or antibody fragment to bind to G-protein alpha may be assayed by a competitive method. A "competitive method" consists of testing an antibody (or an antibody fragment) for its capacity for blocking binding between a reference antibody or antibody fragment and an antigen or for competing with a reference antibody or antibody fragment for binding to the antigen. In other words, an antibody that competes with the reference antibody or antibody fragment binds to the same epitope as the reference antibody or antibody fragment or to an epitope that is sufficiently close to the epitope recognized by the reference antibody or antibody fragment to prevent binding of the reference antibody or antibody fragment for reasons of steric hindrance.

Many types of competitive methods may be used for determining whether an antibody or an antibody fragment competes with a reference antibody or antibody fragment, for example: by a competitive ELISA assay, by an immunofluorescent method e.g. by a FRET or HTRF ("Homogeneous Time Resolved Fluorescence") assay, by an immunoluminescence method, by a direct or indirect sandwich method, by direct or indirect solid-phase radioimmunoassay (RIA), by direct or indirect solid-phase enzymatic immunoassay (EIA), by surface plasmon resonance technology (e.g. BIACORE), by flow cytometry, by fluorescence polarization (for example between a fluorescent peptide and the antibody to be tested), etc. For example, the competitive ELISA method involves the use of a purified antigen bound to a solid surface or to cells, the antibody to be tested, which binds to the unlabeled antigen and a labeled reference antibody or antibody fragment. Usually, the reference antibody or antibody fragment is present in nonsaturating concentration (relative to its dissociation constant Kd for G-protein alpha) and the signal is measured at increasing concentrations of the antibody or antibody fragment to be tested. When an antibody is present in excess, it may block or inhibit (for example reduce) the specific binding of a reference antibody or antibody fragment to an antigen of at least 40-45%, 45-50%, 50-55%, 55-60%, 60-65%, 65-70%, 70-75% or 75% or more. In some cases, binding is inhibited by at least 80 to 85%, 85 to 90%, 90 to 95%, 95 to 97% or 97% or more.

In particular, the antibodies or the antibody fragments that compete for binding to G-protein alpha with the reference antibody or antibody fragment are identified by performing an HTRF assay or by performing a fluorescence polarization assay, preferably an HTRF assay. When an antibody or an antibody fragment competes for binding to G-protein alpha with the reference antibody or antibody fragment, it is capable of inhibiting an HTRF signal generated by the reference antibody or antibody fragment. Conversely, an antibody or an antibody fragment that does not compete for binding to G-protein alpha with the reference antibody or antibody fragment is not capable of inhibiting an HTRF signal generated by the reference antibody or antibody fragment.

The competitive antibodies or antibody fragments according to the invention may, for example, be obtained with the reference antibody or antibody fragment by carrying out the protocol described in Example 1. The antibody DSV38S is a competitive antibody according to the invention.

In a particular embodiment, the antibody DSV38S and/or the antibody DSV36S is/are excluded from the competitive antibodies or antibody fragments according to the invention.

The reference antibodies or antibody fragments and the competitive antibodies or antibody fragments as defined above are together called "antibodies or antibody fragments according to the invention" hereinafter.

The antibody or antibody fragment according to the invention may bind to G-protein alpha in an isolated form and/or present in a membrane environment, for example it may bind to a G-protein alpha present in a preparation of membranes bearing one or more GPCRs and one or more G-proteins alpha. It is not necessary for the G-protein alpha to be complexed with the GPCR for the antibody according to the invention to be able to bind to G-protein alpha.

The antibody or antibody fragment according to the invention may bind to the G-protein alpha with a dissociation constant (Kd) measured by FRET less than or equal to 20 nM. A dissociation constant lower than 20 nM is preferable for proper performance of a RET. Advantageously, the antibody or antibody fragment according to the invention may bind to G-protein alpha with a dissociation constant (Kd) measured by FRET less than or equal to 20 nM, for example an affinity constant less than or equal to 10 nM or else less than or equal to 5 nM, for example from 0 to 20 nM (0 being excluded), from 0 to 10 nM (0 being excluded), from 0 to 5 nM (0 being excluded). A method for measuring Kd of an antibody or of an antibody fragment according to the invention by FRET is described in Example 2.

The antibody or antibody fragment according to the invention may be used in a method of RET with a GTP labeled with a member of a pair of RET partners.

The antibody or antibody fragment according to the invention is particularly advantageous when performing a RET, in particular a FRET, in particular for detecting activation of a G-protein alpha. Thus, the antibody or antibody fragment according to the invention may be coupled to a molecule allowing its detection. Advantageously, the antibody or antibody fragment according to the invention may be labeled with a member of a pair of RET partners.

For example, antibodies or antibody fragments according to the invention may be obtained by carrying out the protocol described in Example 1.

The inventors have also shown that the antibodies or antibody fragments according to the invention bind to the SwitchII domain of G-protein alpha, and more particularly to the peptide 215-294 of G-protein alpha.

Labeling of the Antibody or Antibody Fragment According to the Invention

The antibody or antibody fragment according to the invention may be labeled directly or indirectly by methods that are familiar to a person skilled in the art, for example as described hereunder, but preferably the antibody is labeled directly, by covalent bond to a member of a pair of RET partners.

The term "pair of RET partners" denotes a pair consisting of an energy donating compound (hereinafter "donor compound") and an energy accepting compound (hereinafter "acceptor compound"); when they are close to one another and when they are excited at the excitation wavelength of the donor compound, these compounds emit a RET signal. It is known that for two compounds to be RET partners, the emission spectrum of the donor compound must partially overlap the excitation spectrum of the acceptor compound. For example, they are called "pairs of FRET partners" when using a fluorescent donor compound and an acceptor compound or "pair of BRET partners" when using a bioluminescent donor compound and an acceptor compound.

Direct labeling of the antibody or antibody fragment with a member of a pair of RET partners, for example a fluorescent compound when employing a FRET, may be carried out by the conventional methods known by a person skilled in the art, based on the presence of reactive groups on the antibody or antibody fragment. For example, the following reactive groups may be used: terminal amino group, carboxylate groups of aspartic and glutamic acids, the amine groups of lysins, the guanidine groups of arginines, the thiol groups of cysteines, the phenol groups of tyrosines, the indole rings of tryptophans, the thioether groups of methionines, the imidazole groups of histidines.

The reactive groups may form a covalent bond with a reactive group carried by the antibody or antibody fragment. Suitable reactive groups, carried by the antibody or antibody fragment, are well known by a person skilled in the art, for example a donor compound or an acceptor compound functionalized with a maleimide group will for example be capable of binding covalently to the thiol groups carried by the cysteines carried by the antibody or antibody fragment. Similarly, a donor/acceptor compound bearing an ester of N-hydroxysuccinimide will be capable of binding covalently to an amine present on the antibody or antibody fragment.

The antibody or antibody fragment according to the invention may also be labeled with a fluorescent or bioluminescent compound indirectly, for example by introducing an antibody or an antibody fragment into the measurement medium, itself bound covalently to an acceptor/donor compound, this second antibody or antibody fragment specifically recognizing the antibody or antibody fragment according to the invention.

Another quite conventional means of indirect labeling consists of fixing biotin on the antibody or antibody fragment to be labeled, then incubating this biotinylated antibody or antibody fragment in the presence of streptavidin labeled with an acceptor/donor compound. Suitable biotinylated antibodies or antibody fragments may be prepared by techniques familiar to a person skilled in the art; the company Cisbio Bioassays markets for example streptavidin labeled with a fluorophor with the trade name "d2" (ref. 610SADLA).

In the context of the invention, the antibody or the antibody fragment is labeled with (i) a fluorescent donor compound or luminescent donor compound, or (ii) a fluorescent acceptor compound or a nonfluorescent acceptor compound (quencher). Preferably, the antibody or the antibody fragment is labeled with a fluorescent acceptor compound or a nonfluorescent acceptor compound (quencher).

According to one embodiment of the invention, the antibody or the antibody fragment is labeled with a fluorescent acceptor compound, for example selected from allophycocyanins, rhodamines, cyanins, squaraines, coumarins, proflavins, acridines, fluoresceins, boron-dipyrromethene derivatives, nitrobenzoxadiazole and a quantum dot, GFP, GFP variants selected from GFP10, GFP2 and eGFP, YFP, YFP variants selected from eYFP, YFP topaz, YFP citrine, YFP venus and YPet, mOrange and DsRed.

According to another embodiment of the invention, the antibody or the antibody fragment is labeled with a fluorescent donor compound, for example selected from a europium cryptate, a europium chelate, a terbium chelate, a terbium cryptate, a ruthenium chelate, a quantum dot, allophycocyanins, rhodamines, cyanins, squaraines, coumarins, proflavins, acridines, fluoresceins, boron-dipyrromethene derivatives and nitrobenzoxadiazole, preferably selected from: a europium cryptate; a europium chelate; a terbium chelate; a terbium cryptate; a ruthenium chelate; and a quantum dot; the chelates and the cryptates of europium and of terbium being particularly preferred.

According to another embodiment of the invention, the antibody or the antibody fragment is labeled with a luminescent donor compound, for example selected from Luciferase (luc), Renilla Luciferase (Rluc), the variants of Renilla Luciferase (Rluc8) and Firefly Luciferase.

The methods of labeling and the labels that may be used in the context of the present invention are described in the French patent application filed on Jan. 30, 2019 under number FR1900880, incorporated here by reference.

Composition of Antibody or of Antibody Fragment

A third object of the invention relates to a composition comprising the antibody or the antibody fragment described above. The composition according to the invention may further comprise a source of GTP labeled with a member of a pair of RET partners.

The GTP labeled with a member of a pair of RET partners is described hereunder in the "kit-of-parts" section.

Kit-of-Parts

A fourth object of the invention relates to a kit of reagents (kit-of-parts) comprising (i) the antibody or antibody fragment according to the invention (reference or competitive as defined above) and (ii) a source of GTP labeled with a member of a pair of RET partners ("labeled GTP" hereinafter).

The GTP may be a nonhydrolyzable or slowly hydrolyzable GTP, such as GTPgammaS (GTPγS or GTPgS), GppNHp and GppCp.

groups. Similarly, a donor/acceptor compound bearing an ester of N-hydroxysuccinimide will be capable of binding covalently to an amine.

In the context of the invention, the GTP is labeled with (i) a fluorescent donor compound, or (ii) a fluorescent acceptor compound or a nonfluorescent acceptor compound (quencher). Preferably, the GTP is labeled with a fluorescent donor compound.

In a particular embodiment, the labeled GTP is a nonhydrolyzable or slowly hydrolyzable GTP labeled with a fluorescent donor compound selected from GTPgN-C2 (GTP-gamma-N-C2), GTPgN-C3 (GTP-gamma-N-C3), GTPgN-octyl-C2 (GTP-gamma-N-octyl-C2), GTPgN-octyl-C11 (GTP-gamma-N-octyl-C11), GTPgN-octyl-C3 (GTP-gamma-N-octyl-C3), GTPgO-hexyl-C2 (GTP-gamma-0-hexyl-C2), GTPgO-hexyl-C3 (GTP-gamma-O-hexyl-C3) or GTP-gN-octyl-thiosuccinimidyl-C2 (GTP-gamma-N-octyl-thiosuccinimidyl-C2), preferably GTP-gN-octyl-thiosuccinimidyl-C2.

According to the invention, the labeled GTP is a nonhydrolyzable or slowly hydrolyzable GTP labeled with a fluorescent acceptor compound selected from GTPgN-octyl-Cy5, GTPgN-octyl-AF488, GTPgN-L15-Fluorescein, GTPgO-Linker-Cy5(P) or GTPgS-Linker-Cy5(R). The GTP may also be labeled with a nonfluorescent acceptor compound (quencher).

GTP-gN-octyl-thiosuccinimidyl-C2 is shown below.

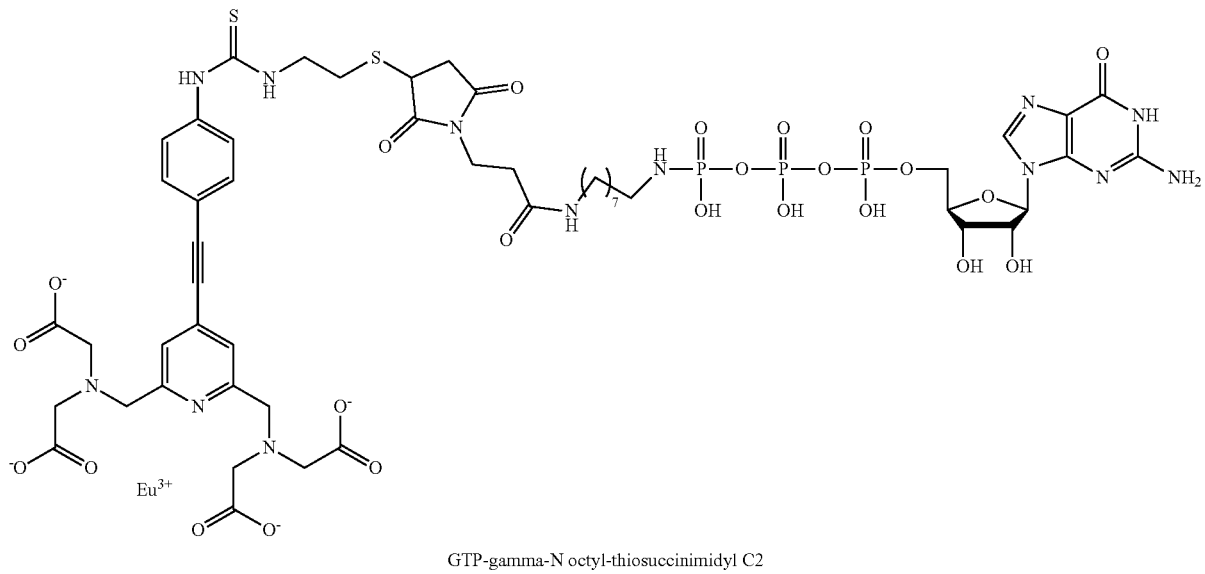

GTP-gamma-N octyl-thiosuccinimidyl C2

The GTP may be labeled directly or indirectly. Preferably, the GTP is labeled directly. The direct labeling of the GTP with a member of a pair of RET partners, for example a fluorescent compound when employing a FRET, may be carried out by the methods based on the presence of reactive groups on the GTP.

The reactive groups may form a covalent bond with a reactive group carried by a member of a pair of RET partners. Suitable reactive groups, carried by the member of a pair of RET partners, are well known by a person skilled in the art, for example a donor compound or an acceptor compound functionalized with a maleimide group will for example be capable of binding covalently to the thiol In a particular embodiment of the invention, the GTP is labeled with a fluorescent donor compound and the antibody or antibody fragment is labeled with a fluorescent acceptor compound or a nonfluorescent acceptor compound (quencher). In another particular embodiment, the GTP is labeled with a fluorescent acceptor compound or a nonfluorescent acceptor compound (quencher) and the antibody or antibody fragment is labeled with a fluorescent donor compound or luminescent donor compound.

The other labeled GTPs mentioned above and their method of preparation are described in the French patent application filed on 30 Jan. 2019 under number FR1900856, incorporated here by reference.

Advantageously, (i) is an antibody comprising a heavy chain variable domain that consists of the amino acid sequence SEQ ID NO: 14 and a light chain variable domain that consists of the amino acid sequence SEQ ID NO: 15 and (ii) is GTP-gN-octyl-thiosuccinimidyl-C2.

Other Objects

A fifth object of the present invention relates to a nucleic acid sequence coding for the (reference or competitive) antibody or antibody fragment according to the invention.

A sixth object of the present invention relates to a vector comprising a nucleic acid sequence according to the invention. Any type of vector suitable for production of antibodies may be used in the context of the invention. In particular, the vector is a recombinant vector. The vector will comprise the necessary nucleic acid sequences for producing the antibody according to the invention, for example promoter sequences, regulatory sequences, etc. The preparation of a suitable vector is widely described in the literature.

A seventh object of the invention relates to a cell comprising a vector according to the invention or a nucleic acid sequence according to the invention. The cell according to the invention may be obtained by methods that are widely described in the literature, for example by transfecting a cellular clone with a vector according to the invention or a nucleic acid sequence. The invention is not limited to a particular cellular type. Any cells capable of producing antibodies may be used in the context of the invention. They may be eukaryotic cells, such as mammalian cells, for example human cells or mouse cells or prokaryotic cells, for example bacteria or yeasts.

The invention will be further illustrated by the figures and examples given hereunder. However, these examples and these figures are in no case to be interpreted as limiting the scope of the invention.

EXAMPLES

Materials

Figure 1:
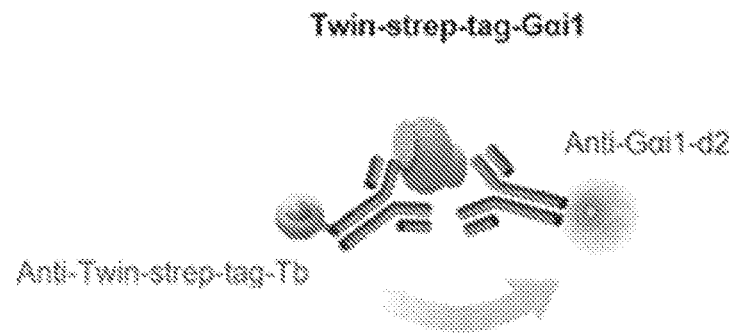
FIG. 1 shows the reaction scheme of a FRET for measuring Kd of an anti-G-protein alphai1 antibody.

The cell membrane preparations expressing the Delta Opioid receptor (DOR) were purchased from Euroscreen via a service provision.

The antibodies DSV36S, DSV38S, DSV 26S, DSV 3S and DSV 39S were generated by Cisbio Bioassays and are available from Cisbio Bioassays on request (under the respective references DSV36S, DSV38S, DSV 26S, DSV 3S and DSV 39S). The antibody DSV36S comprises a heavy chain variable domain that consists of the amino acid sequence SEQ ID NO: 14 and a light chain variable domain that consists of the amino acid sequence SEQ ID NO: 15. The antibodies were labeled with compatible fluorescent probes for TR-FRET detection (acceptor red—d2 or donor Lumi4Tb).

The antibodies SC13533 and SC56536 were purchased from Santa Cruz Biotechnology (ref. SC13533 and ref. SC56536). The antibody AM05302PU-N was purchased from Acris Antibodies GmbH (ref. AM05302PU-N).

The anti Twin-Strep-tag antibody was purchased from IBA Lifesciences (ref. 2-1517-001) and labeled with a fluorescent probe compatible with TR-FRET detection (donor Lumi4Tb).

The antibody anti-FLAG-d2 is available from Cisbio Bioassays (Ref. 61FG2DLF).

The nucleotides GDP and GTPγS were purchased from Sigma Aldrich (respective catalog references G7127 and G8634).

The agonist of the Delta Opioid GPCRs (SNC162) was purchased from Tocris Biosciences (reference 1529).

The 384-well Low volume plates, white with white bottom and black 96-well plates (with black bottom) suitable for cell culture were purchased from Greiner Bio One (Catalog references 784075 and 665086 respectively).

The nonhydrolyzable/slowly hydrolyzable GTP analog (GTPgN-octyl-C2) labeled with a donor fluorophor (europium cryptate) was synthesized by Cisbio Bioassays. The nonhydrolyzable/slowly hydrolyzable GTP analog (GTPgO-Linker-Cy5(P)) labeled with an acceptor fluorophor (Cy5) was purchased from Jena Bioscience (ref. NU-834-Cy5).

The human recombinant G-protein alpha1 fused at the N-terminal with a Tag Twin-Strep-tag was produced and purified by Cisbio Bioassays.

The plasmids coding for the various human G-proteins, Gαi1, Gαi2, Gαi3, Gαo, Gαz, Gαs, Gαq, Gα12 and Gα13 fused in their N-terminal part with the tags Twin-Strep-tag and FLAG were synthesized and amplified by the company Genecust (service provision).

The HEK293 cells were purchased from ATCC.

The reagents and media used in the cellular experiments, Opti-MEM medium, Lipofectamine 2000 and polyornithine were purchased respectively from Thermo Fisher Scientific (ref. 51985-026 and 11668-019) and Sigma Aldrich (ref. P4957).

Method

Reading the FRET Signal (HTRF Technology)

The HTRF signal was measured on the PHERAstar reader (BMG Labtech) with the following configuration:

Module: HTRF (Excitation 337 nm, Emission 665 nm and 620 nm)

Excitation: laser, 40 flashes or lamp, 100 flashes

Reading window: delay: 60 μs–Integration: 400 μs.

Processing the HTRF Signal

The HTRF Ratio was calculated from the raw signals at 665 nm and 620 nm according to the following formula:

HTRF Ratio=Signal at 665 nm/Signal at 620 nm*10,000.

Example 1: Protocol for Obtaining Anti-Protein-G Alpha1 Antibodies According to the Invention Immunization of Mice The recombinant TST-G protein alpha1 (G-protein alpha1 of sequence UniProt P63096-1 tagged at the N-terminal with the tag TwinStreptag (TST) (IBA) via a linker TEV) was produced in Sf9 insect cells (infection with a baculovirus coding for said protein) and then purified on an affinity column via the tag TwinStreptag (TST) (Strep-Tactin Superflow high capacity resin (IBA, Catalog: 2-1208-002)).

BALB/c mice were immunized by injection of the TST-G protein alpha1 diluted beforehand in buffer containing GTPgS (HEPES 20 mM pH8, NaCl 100 mM, MgCl2 3 mM, CHAPS 11 mM, GTPgS 100 μM). The primary injection was followed by three boosters at one-month intervals.

Fifteen days after each injection, blood samples taken from the mice made it possible to verify the presence of an immune response.

For this, an assay of the ELISA type was set up. The TST-G protein alpha1 diluted beforehand to 20 μg/mL in buffer containing GTPgS (Tris HCl 20 mM pH8.5, NaCl 140 mM, EDTA 2 mM, MgCl2 10 mM, BSA 0.1%, GTPgS 1 μM) was adsorbed via the tag TwinStreptag on 96-well plates containing Strep-Tactin®XT (IBA, Catalog: 2-4101-001). For this, 100 μl of protein was added to each well and was then incubated for 2 h at 37° C. followed by washing three times in PBS buffer 1×, 0.05% Tween20.

Serial dilutions by a factor of 10 to 100 million of the blood samples were then added to a level of 100 μL/well and incubated for 2 h at 37° C. The antibodies not fixed to the protein were removed by three washing steps in PBS buffer 1×, 0.05% Tween20 and then detection of the fixed antibodies was carried out using a secondary anti-mouse Fc antibody bound to HRP (horseradish peroxidase) (Sigma #A0168 diluted 1/10 000 in PBS, BSA 0.1%). After incubation for 1 h at 37° C. and then washing three times in PBS buffer 0.05% Tween20, detection of the HRP was carried out by colorimetric assay at 450 nm following incubation of its substrate TMB (3,3',5,5'-tetramethylbenzidine, Sigma #T0440) for 20 min at room temperature with stirring.

In order to be sure that the antibodies detected by the ELISA assay were indeed directed against G-protein alpha1 and not against the tag TwinStrepTag, the same blood samples were tested in the ELISA assay after preincubation with an excess of another orthogonal protein tagged with the TwinStrepTag (SNAPTag-TwinStrepTag). Thus, the anti tag antibodies are fixed on the tagged orthogonal protein and therefore not on the G-protein alpha1 attached to the bottom of the wells; in which case no HRP signal or a decrease in the HRP signal is detected.

The mice having the best antibody titers and the least decrease in signal in the anti tag control case were selected for the next step of lymphocyte hybridization, also called fusion. The mouse spleen was recovered and a mixture of the lymphocytes and plasmocytes obtained from this spleen was fused in vitro with a myeloma cell line in the presence of a cellular fusion catalyst of the polyethylene glycol type. A mutant myeloma cell line, lacking the enzyme HGPRT (Hypoxanthine Guanosine Phosphoribosyl Transferase) was used for allowing selection of the hybrid cells, called hybridomas. These cells were cultured in a medium containing hypoxanthine, aminopterin (methotrexate) and thyamine (HAT medium) to permit removal of the unfused myeloma cells and thus selection of the hybridomas of interest. The unfused spleen cells die, since they are incapable of proliferating in vitro. Thus, only the hybridomas survived.

These hybridomas were then cultured in culture dishes. The supernatants of these hybridomas were then tested to evaluate their capacity to produce anti-G-protein alphai1 antibodies. For this, an ELISA assay as described above was carried out.

In order to evaluate the selectivity of the antibodies between the different forms of the G-protein alphai1 (full form bound to GDP vs full form bound to GTPgS vs empty form), the assay was carried out in parallel for conditions of TST-G protein alphai1 preincubated in the buffer containing either GDP at 1 µM, or GTPgS at 1 µM or without nucleotide. The best hybridomas were then cloned with a limiting dilution step in order to obtain hybridoma clones.

The clones of hybridomas of interest were then injected in mice (intraperitoneal injection) in order to allow production of the antibodies in large amounts in the ascitic fluid.

The antibodies were then purified by affinity chromatography on columns with resins having protein A.

Capacity of the Aforementioned Purified Antibodies to Compete for Binding to G-Protein Alpha with the Antibody DSV36S All the reagents are diluted in buffer TrisHCl 50 mM pH 7.4, MgCl2 10 mM, BSA 0.1%, NaCl 10 mM. The G-protein αi1 is prepared 2× to obtain a final concentration in the wells of 2.5 nM. The nucleotide GTPgS is prepared 2× to obtain a final concentration in the wells of 10 µM. These 2 reagents are prepared in one and the same solution and are preincubated for 30 minutes at room temperature before being distributed in the wells. The aforementioned purified antibodies are prepared 4× for final concentrations in the wells between 0.01 and 1 µM. The antibody DSV36S-d2 is prepared 4× for a final concentration of 10 nM. The anti Twin-Strep-tag-Lumi4 Tb antibody is prepared 4× to obtain a final concentration in the wells of 0.5 nM.

The reagents are distributed in the 384-well plates as follows:

1. 10 µl of the preincubated mixture of G-protein αi1+ GTPgS is put in each well.
2. 5 µl of the purified antibody is added to each well.
3. The plates are incubated for 30 minutes at room temperature.
4. 5 µl of the mixture of anti Twin-Strep-tag-Lumi4 Tb antibody and antibody DSV36S-d2 is added to each well.

The plates are incubated for 1 h at room temperature before reading the HTRF signal.

The antibodies according to the invention are capable of inhibiting the HTRF signal obtained with the antibody DSV36S-d2. Conversely, the antibodies that are not according to the invention are not capable of inhibiting the signal generated by DSV36S-d2

Example 2: Determination of the Affinity of the Antibodies SC13533, DSV36S, DSV38S Labeled with d2 for the G-Protein αi1

Experimental Protocol

All the reagents were diluted in buffer TrisHCl 50 mM pH 7.4, MgCl2 10 mM, BSA 0.1%, NaCl 10 mM αi1 The G-protein αi1 was prepared 2× to obtain a final concentration in the wells of 2.5 nM. The nucleotide GTPgS was prepared 2× to obtain a final concentration in the wells of 100 µM. These two reagents were prepared in one and the same solution and were preincubated for 30 minutes at room temperature before being distributed in the wells. The antibodies DSV36S-d2, DSV38S-d2 and SC13533-d2 were prepared 4× for final concentrations in the wells between 0.01 and 10 nM depending on the antibodies. The anti Twin-Strep-tag-Lumi4 Tb antibody was prepared 4× to obtain a final concentration in the wells of 0.25 nM.

The reagents were distributed in the 384-well plates as follows:

1) 10 µl of the preincubation mixture of G-protein αi1+ buffer only or GTPgS or GDP was put in each well,
2) 5 µl of the antibody DSV36S or DSV38S or SC13533 labeled with d2 was added to each well,
3) 5 µl of the anti Twin-Strep-tag-Lumi4 Tb antibody was added to each well.

The plates were incubated for 24 h at room temperature before reading the HTRF signal.

The reaction scheme is illustrated in FIG. 1.

Results

Figure 2:
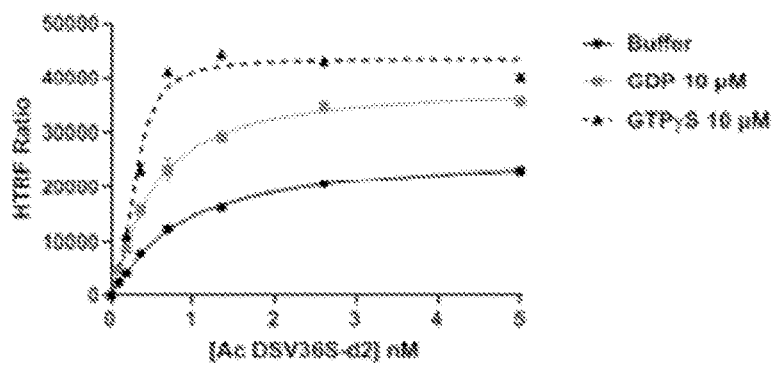
FIG. 2 shows curves that illustrate the affinity of the antibodies SC13533, DSV36S and DSV38S labeled with d2 for the human G-protein αi1 (or protein Gαi1). In the presence of the G-protein αi1, a very significant HTRF signal is obtained with all the antibodies in the presence of and in the absence of nucleotide (GTPgS or GDP). The results indicate that the antibodies DSV36S, DSV38S and SC13533 are capable of binding the G-protein αi1. The curves make it possible to calculate the affinity (Kd) of these different antibodies for the protein Gαi1 (Table 1).
Figure 2:
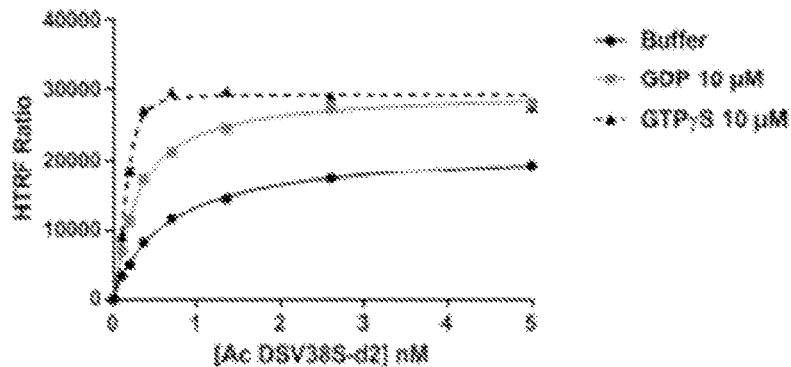
Figure 2:
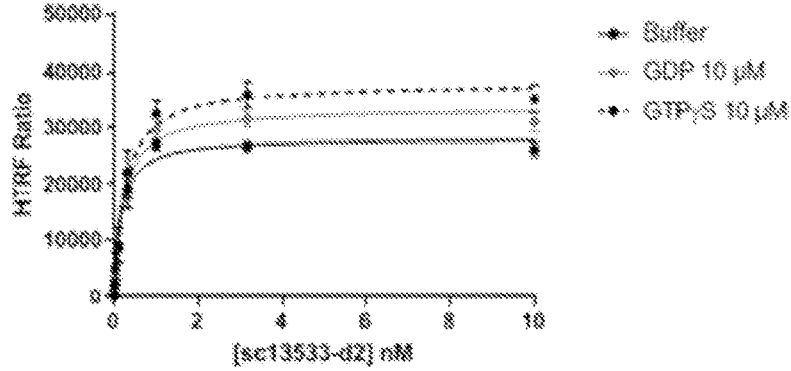

FIG. 2 shows the results obtained with the antibodies DSV36S, DSV38S and SC13533 labeled with d2. In the presence of the G-protein αi1, a very significant HTRF signal is obtained with all these antibodies in the presence of and in the absence of nucleotide (GTPgS or GDP). These results indicate that the antibodies DSV36S, DSV38S and SC13533 are capable of binding the G-protein αi1.

Moreover, the antibody titration curves obtained make it possible to calculate the affinity (Kd) of these different antibodies for the G-protein αi1. This was carried out using the GraphPad Prism software by applying a "one site specific binding" model to the HTRF data. The values of Kd obtained are presented in Table 1.

TABLE 1

| Condition | Kd of the antibody DSV36S (nM) | Kd of the antibody DSV38S (nM) | Kd of the antibody SC13533 (nM) |
|---|---|---|---|
| Buffer only | 0.82 | 0.65 | 0.16 |
| GDP 10 µM | 0.48 | 0.29 | 0.22 |
| GTP 10 µM | 0.31 | 0.14 | 0.26 |

The values of Kd show that the 3 antibodies have excellent affinity for the G-protein αi1, the values of Kd being between 0.1 and 1 nM regardless of the state of the protein.

However, it may be noted that the antibodies DSV36S and DSV38S gave a higher signal and higher affinity when the G-protein αi1 was bound to a nucleotide (in particular GTPgS). Conversely, the antibody SC13533 showed a similar signal and similar affinity regardless of the state of the G-protein αi1. This suggests that the antibody SC13533 does not bind in the same way as the antibodies DSV36S and DSV38S on the G-protein αi1.

Example 3: Capacity of the Unlabeled Antibodies DSV36S, DSV38S, SC 13533, SC56536 and AM05302PU-N to Inhibit Binding of the Antibody SC13533-d2 on the G-Protein i1

Experimental Protocol

All the reagents were diluted in buffer TrisHCl 50 mM pH 7.4, MgCl2 10 mM, BSA 0.1%, NaCl 10 mM. The G-protein αi1 was prepared 2× to obtain a final concentration in the wells of 2.5 nM. The nucleotide GTPgS was prepared 2× to obtain a final concentration in the wells of 10 µM. These two reagents were prepared in one and the same solution and were preincubated for 30 minutes at room temperature before being distributed in the wells. The cold antibodies DSV36S, DSV38S and SC13533 were prepared 4× for final concentrations in the wells between 0.01 and 100 nM. The antibody SC 13533-d2 was prepared 4× for a final concentration of 10 nM. The anti Twin-Strep-tag-Lumi4 Tb antibody was prepared 4× to obtain a final concentration in the wells of 0.5 nM.

The reagents were distributed in the 384-well plates as follows:
1) 10 µl of the preincubated mixture of G-protein αi1+ GTPgS was put in each well,
2) 5 µl of the unlabeled antibody DSV36S or DSV38S or SC56536 or AM05302PU-N or SC13533 was added to each well,
3) The plates were incubated for 30 minutes at room temperature,
4) 5 µl of the anti Twin-Strep-tag-Lumi4 Tb antibody and of the antibody SC13533-d2 were added to each well.

The plates were incubated for 1 h at room temperature before reading the HTRF signal.

Results

Figure 3:
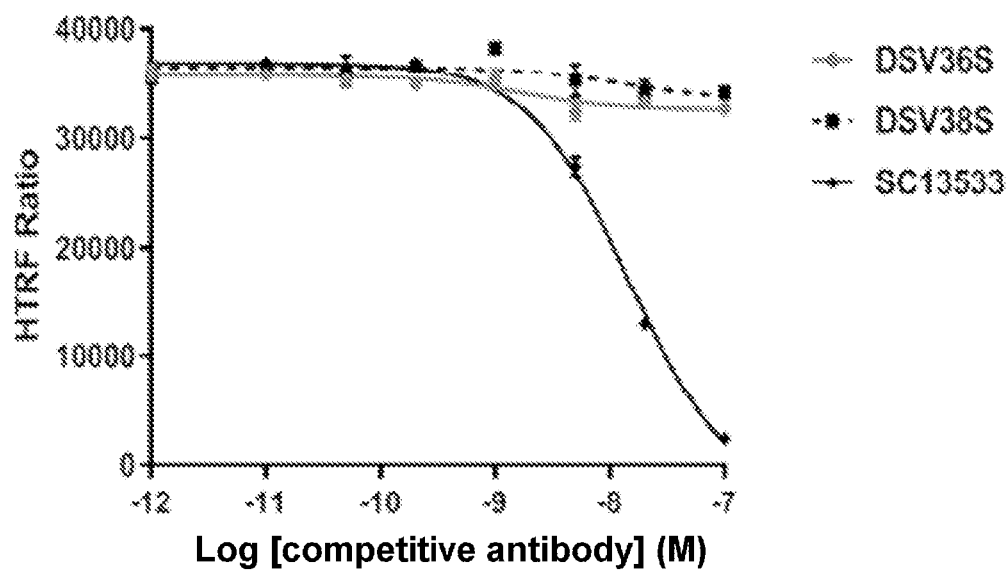
FIG. 3 is a curve that illustrates the capacity of the unlabeled antibodies DSV36S, DSV38S and SC 13533 to inhibit binding of the antibody SC13533-d2 on the human G-protein i1. Logically, the unlabeled antibody SC 13533 has completely inhibited the HTRF signal obtained with antibody SC 13533-d2. Conversely, the antibodies DSV36S and DV38S were not capable of inhibiting the signal generated by SC 13533-d2. This demonstrates that these 2 antibodies do not bind to the same region of the G-protein αi1 as the antibody SC 13533. In conclusion, the antibodies DSV36S and DSV38S recognize different epitopes of the antibody SC 13533.

FIG. 3 shows the results obtained with the antibodies DSV 36S, DSV 38S and SC 13533. Logically, the unlabeled antibody SC 13533 has completely inhibited the HTRF signal obtained with antibody SC 13533-d2. Conversely, the antibodies DSV36S and DV38S were not capable of inhibiting the signal generated by SC 13533-d2. This demonstrates that these 2 antibodies do not bind to the same region of the G-protein αi1 as the antibody SC 13533. In conclusion, the antibodies DSV36S and DSV38S recognize different epitopes of the antibody SC 13533.

Figure 4:
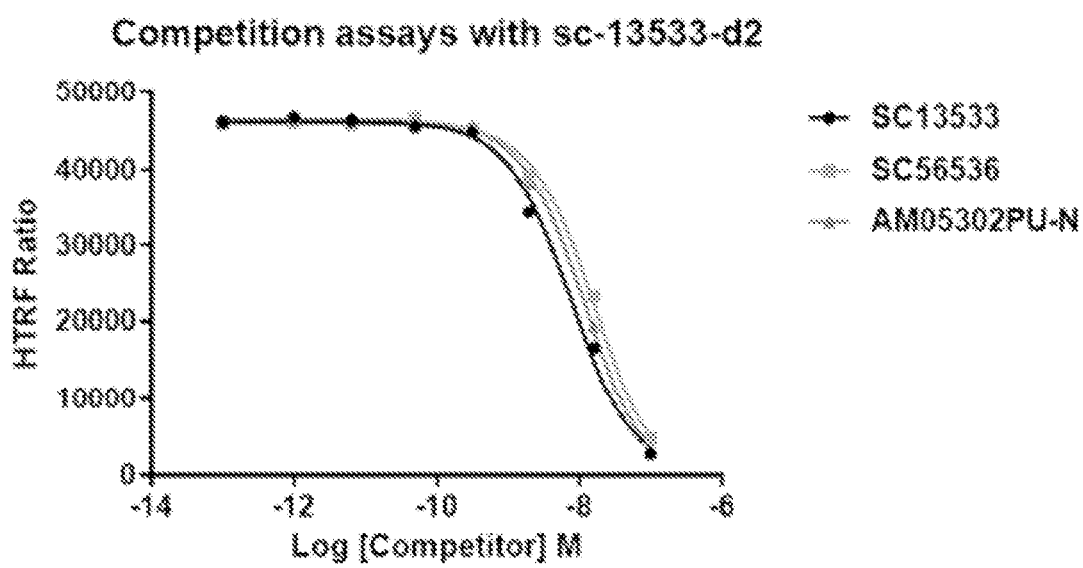
FIG. 4 shows the capacity of the commercial antibodies sc-13533, sc-56536 and AM05302PU-N to inhibit binding of the antibody DSV SC13533-d2 on the human G-protein i1. Logically, the unlabeled antibody DSV SC13533 has completely inhibited the HTRF signal obtained with antibody SC13533-d2. Moreover, the antibodies sc-56536 and AM05302PU-N have completely inhibited the HTRF signal obtained with antibody SC13533-d2. In conclusion, the commercial antibodies sc-13533, sc-56536 and AM05302PU-N are all noncompetitive antibodies of the antibody DSV 36S. All these antibodies therefore recognize a different epitope of the antibody DSV 36S.

FIG. 4 shows the results obtained with the antibodies SC13533, SC56536 and AM05302PU-N. Logically, the unlabeled antibody DSV SC13533 has completely inhibited the HTRF signal obtained with antibody SC13533-d2. Moreover, the antibodies sc-56536 and AM05302PU-N have completely inhibited the HTRF signal obtained with antibody SC13533-d2. Since the antibody SC 13533 does not compete with the antibodies DSV36S and DSV38S, and the antibodies SC56536 and AM05302PU-N are capable of inhibiting the HTRF signal obtained with antibody SC13533-d2, the antibodies sc-56536 and AM05302PU-N are therefore also noncompetitive antibodies of the antibody DSV 36S.

In conclusion, the results presented in FIGS. 3 and 4 demonstrate that the commercial antibodies sc-13533, sc-56536 and AM05302PU-N are all noncompetitive antibodies of the antibody DSV 36S. All these antibodies therefore recognize a different epitope of the antibody DSV 36S.

Example 4: Capacity of the Unlabeled Antibodies DSV3S, SC56536, AM05302PU-N and SC 13533 to Inhibit Binding of the Antibody DSV3S-d2 on the G-Protein i1

Experimental Protocol

All the reagents were diluted in buffer TrisHCl 50 mM pH 7.4, MgCl2 10 mM, BSA 0.1%, NaCl 10 mM. The G-protein αi1 was prepared 2× to obtain a final concentration in the wells of 2.5 nM. The nucleotide GTPgS was prepared 2× to obtain a final concentration in the wells of 10 µM. These two reagents were prepared in one and the same solution and were preincubated for 30 minutes at room temperature before being distributed in the wells. The cold antibodies DSV3S, SC56536, AM05302PU-N and SC 13533 were prepared 4× for final concentrations in the wells between 0.03 and 300 nM. The antibody DSV3S-d2 was prepared 4× for a final concentration of 10 nM. The anti Twin-Strep-tag-Lumi4 Tb antibody was prepared 4× to obtain a final concentration in the wells of 0.25 nM.

The reagents were distributed in the 384-well plates as follows:
1) 10 µl of the preincubated mixture of G-protein αi1+ GTPgS was put in each well,
2) 5 µl of the unlabeled antibody DSV 3S or SC56536 or SC13533 or AM05302PU-N was added to each well,
3) The plates were incubated for 30 minutes at room temperature,
4) 5 µl of the anti Twin-Strep-tag-Lumi4 Tb antibody and of the antibody DSV 3S-d2 were added to each well.

The plates were incubated for 1 h at room temperature before reading the HTRF signal.

Results

Figure 5:
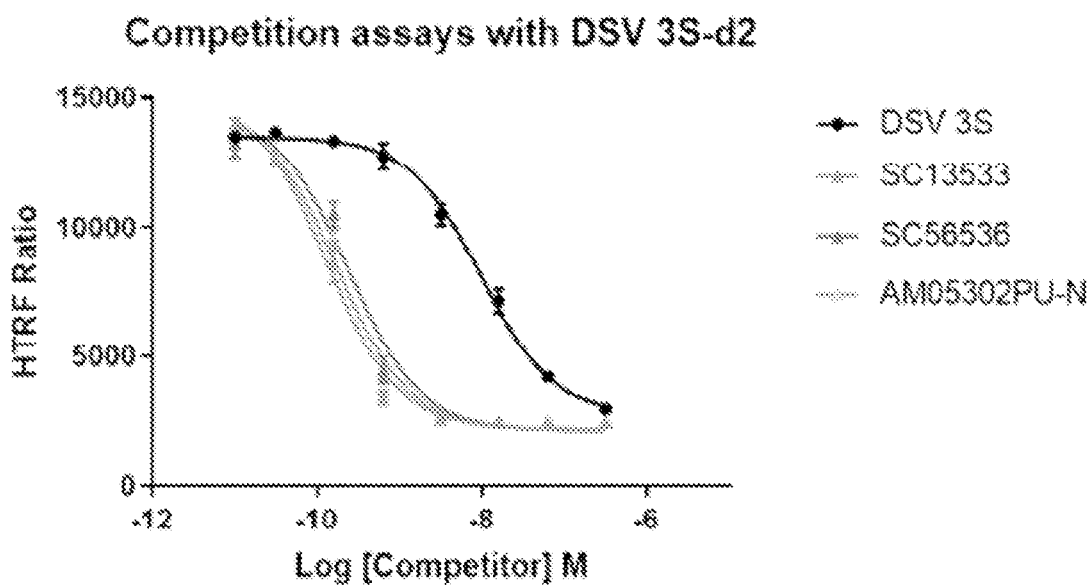
FIG. 5 shows the capacity of the commercial antibodies sc-13533, sc-56536 and AM05302PU-N to inhibit binding of the antibody DSV 3S-d2 (generated in the laboratory) on the human G-protein i1. Logically, the unlabeled antibody DSV 3S has completely inhibited the HTRF signal obtained with antibody DSV 3S-d2. Moreover, the antibodies sc-13533, sc-56536 and AM05302PU-N have completely inhibited the HTRF signal obtained with antibody DSV 3S-d2. In conclusion, these results demonstrate that the commercial antibodies sc-13533, sc-56536 and AM05302PU-N are all noncompetitive antibodies of the antibody DSV 36S. Therefore the same applies to the antibody DSV 3S made in the laboratory. All these antibodies therefore recognize a different epitope of the antibody DSV 36S.

FIG. 5 shows the results obtained. Logically, the unlabeled antibody DSV 3S has completely inhibited the HTRF signal obtained with antibody DSV 3S-d2. Moreover, the antibodies sc-13533, sc-56536 and AM05302PU-N have completely inhibited the HTRF signal obtained with antibody DSV 3S-d2. In conclusion, these results combined with those presented in example 3 demonstrate that the commercial antibodies sc-13533, sc-56536 and AM05302PU-N are all noncompetitive antibodies of the antibody DSV 36S. The same therefore applies to the antibody DSV 3S made in the laboratory. All these antibodies therefore recognize a different epitope of the antibody DSV 36S.

Example 5: Capacity of the Unlabeled Antibodies DSV36S, DSV38S, DSV3S, DSV26S and DSV39S to Inhibit Binding of the Antibody DSV36S-d2 on the G-Protein αi1

Experimental Protocol

All the reagents were diluted in buffer TrisHCl 50 mM pH 7.4, MgCl2 10 mM, BSA 0.1%, NaCl 10 mM. The G-protein αi1 was prepared 2× to obtain a final concentration in the wells of 2.5 nM. The nucleotide GTPgS was prepared 2× to obtain a final concentration in the wells of 100 µM. These two reagents were prepared in one and the same solution and were preincubated for 30 minutes at room temperature before being distributed in the wells. The cold antibodies DSV36S, DSV38S, DSV26S, DSV3S, and DSV39S were prepared 4× for final concentrations in the wells between 0.001 and 1 µM. The antibody DSV36S-d2 was prepared 4× for a final concentration of 10 nM. The anti Twin-Strep-tag-Lumi4 Tb antibody was prepared 4× to obtain a final concentration in the wells of 0.25 nM.

The reagents were distributed in the 384-well plates as follows:
1) 10 µl of the preincubated mixture of G-protein αi1+ GTPgS was put in each well,
2) 5 µl of the unlabeled antibodies DSV36S, DSV38S, DSV26S, DSV3S, and DSV39S was added to each well,
3) The plates were incubated for 30 minutes at room temperature,
4) 5 µl of the anti Twin-Strep-tag-Lumi4 Tb antibody and of the antibody DSV36S-d2 were added to each well.

The plates were incubated for 1 h at room temperature before reading the HTRF signal.

Results

Figure 6:
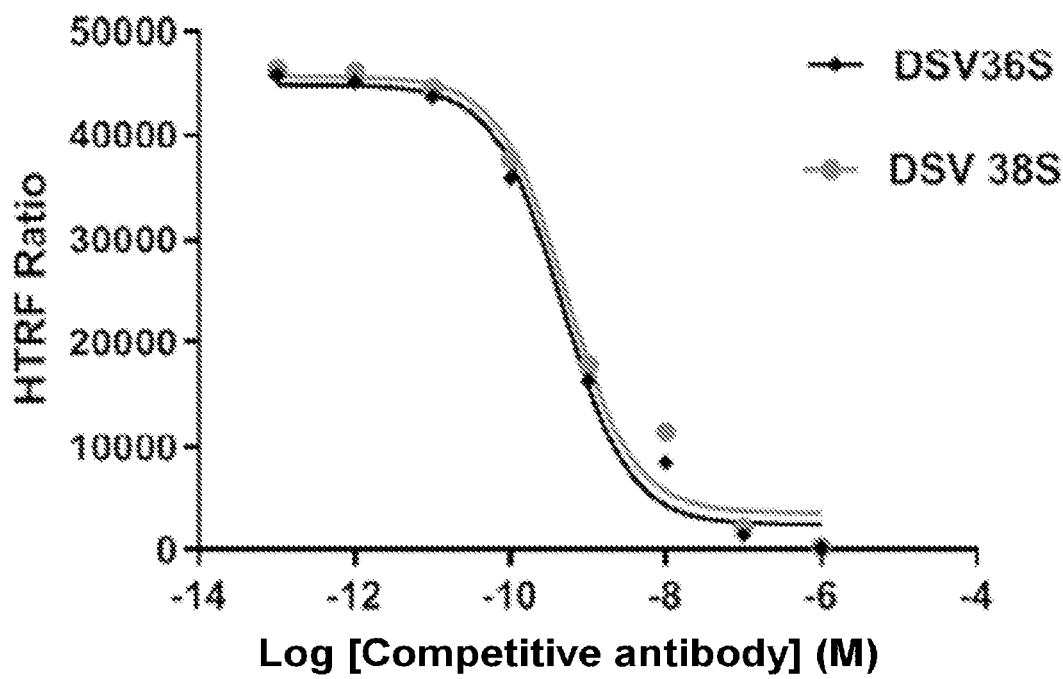
FIG. 6 is a curve illustrating the capacity of the unlabeled antibodies DSV36S and DSV38S to inhibit binding of the antibody DSV36S-d2 on the G-protein αi1. Logically, the unlabeled antibody DSV36S has completely inhibited the HTRF signal obtained with the antibody DSV36S-d2. The antibody DSV38S has also completely inhibited the signal generated by DSV36S-d2. This demonstrates that these 2 antibodies bind to the same region of the G-protein αi1. In conclusion, the antibody DSV38S competes for binding to G-protein alphai with the antibody DSV36S.
Figure 7:
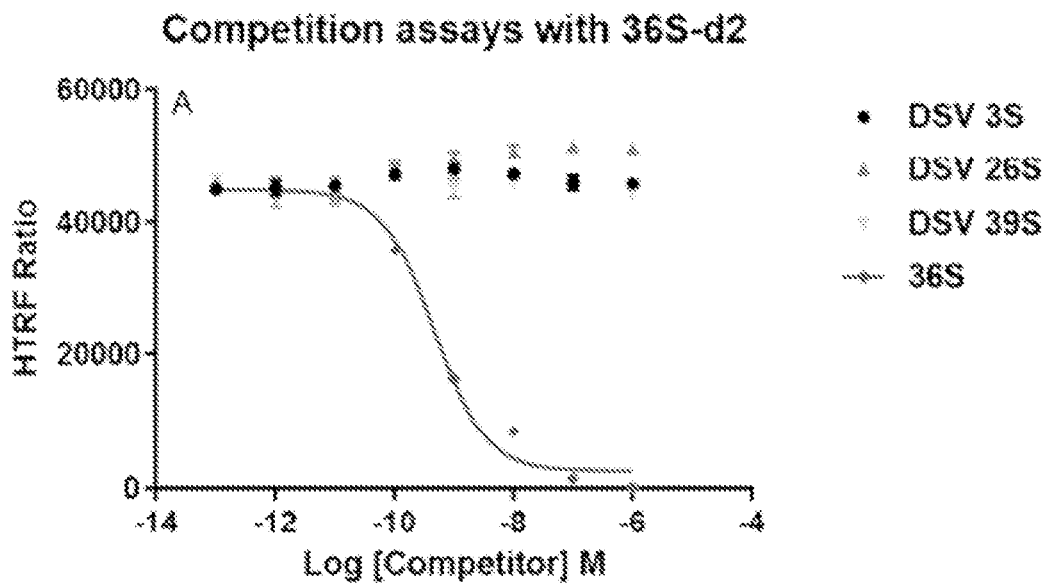
FIG. 7 shows the capacity of the commercial antibodies DSV 36S, DSV 26S, DSV 3S and DSV 39S to inhibit binding of the antibody DSV36S-d2 on the human G-protein i1. Logically, the unlabeled antibody DSV36S has completely inhibited the HTRF signal obtained with the antibody DSV36S-d2. Conversely, the antibodies DSV 26S, DSV 3S and DSV 39S were not capable of inhibiting the signal generated by DSV 36S-d2. This demonstrates that these three antibodies do not bind to the same region of the human G-protein αi1 as the antibody DSV 36S. In conclusion, these antibodies recognize different epitopes of the antibody DSV 36S.

FIG. 6 shows the results obtained with the antibodies DSV36S and DSV38S. Logically, the unlabeled antibody DSV36S has completely inhibited the HTRF signal obtained with the antibody DSV36S-d2. The antibody DSV38S has also completely inhibited the signal generated by DSV36S-d2. This demonstrates that these 2 antibodies bind to the same region of the G-protein αi1. FIG. 7 shows the results obtained with the antibodies DSV36S, DSV26S, DSV3S and DSV39S. Logically, the unlabeled antibody DSV36S has completely inhibited the HTRF signal obtained with the antibody DSV36S-d2. Conversely, the antibodies DSV 26S, DSV 3S and DSV 39S were not capable of inhibiting the signal generated by DSV 36S-d2. This demonstrates that these three antibodies do not bind to the same region of the human G-protein αi1 as antibody DSV 36S.

In conclusion, only the antibody DSV38S competes for binding to G-protein alphai with the antibody DSV36S and therefore shares the same epitope.

Example 6: Selectivity of the Antibodies DSV36S, DSV38S and SC13533 for the Different Types of G-Proteins α when the Latter are Overexpressed in HEK293 cells Day 1: transfection of HEK293 cells with plasmids coding for the different proteins Gαi1, Gαi2, Gαi3, Gαo, Gαz, Gαs, Gαq, Gα12 and human Gα13

A solution containing 1 million HEK cells/ml was prepared in OptiMEM medium. Mixtures of plasmids/Lipofectamine containing 150 ng/well of plasmids and 0.375 µl of lipofectamine were prepared in OptiMEM medium 30 minutes before adding them to the 96-well plate with black-bottomed wells.

Distribution of the reagents in each well of the black microplate suitable for cell culture:
1) 50 µl per well of polyornithine was incubated for 30 minutes at room temperature and then the solution was withdrawn from each well by aspiration.
2) 50 µl of the preparation of HEK293 (cell density of 50000 cells per well) was added to each well
3) 50 µl of the mixture of plasmids coding for a G-protein+lipofectamine was added to each well.

The microplates were incubated for 24 h at 37° C. and 5% CO$_2$ (regulated stove).

Day 2: HTRF assay for measuring the selectivity of the antibodies DSV36S, DSV38S and SC 13533

All the reagents were diluted in buffer TrisHCl 50 mM pH 7.4, MgCl2 10 mM, BSA 0.1%, Tritonx100 0.02%. The antibodies DSV36S-d2, DSV38S-d2 and SC13533-d2 were prepared 4× for a final concentration in the wells of 10 nM. The anti Twin-Strep-tag-Lumi4 Tb antibody was prepared 4× to obtain a final concentration in the wells of 0.5 nM. The nucleotides GDP and GTPgS were prepared 4× to obtain a final concentration in the wells of 10 µM.

The reagents were distributed on the 384-well plates as follows:
1) The OptiMEM culture medium was aspirated,
2) 25 µl of buffer or GDP or GTP was added to each well,
3) 25 µl of buffer was added to each well,
4) 25 µl of antibody DSV36S-d2 or DSV38S-d2 or SC13533-d2 or anti-FLAG-d2 was added to each well,
5) 25 µl of anti Twin-Strep-tag-Lumi4 Tb antibody was added to each well.

The microplates were incubated for 20 h at room temperature before reading the HTRF signal.

Figure 8A:
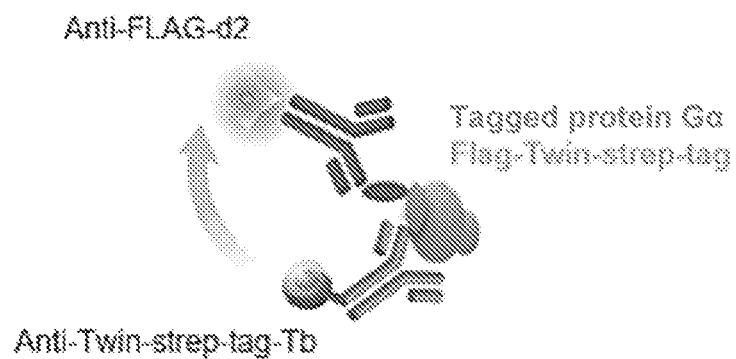
FIGS. 8A and 8B show the reaction scheme of FRET for measuring the selectivity of the antibodies DSV36S, DSV38S and SC13533 for different types of G-proteins α.
Figure 8B:
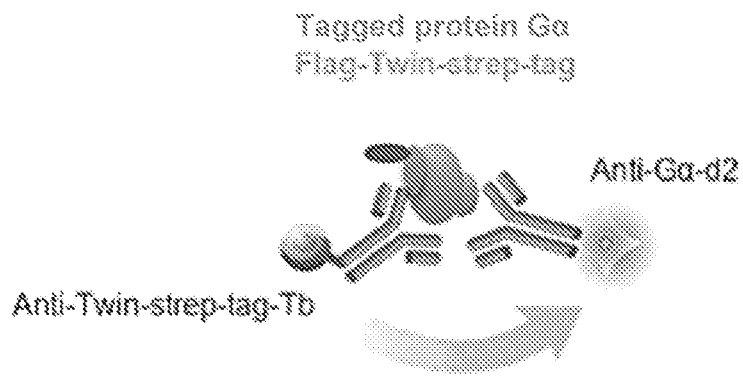

The reaction scheme is illustrated in FIGS. 8A and 8B.

Results

Figure 9:
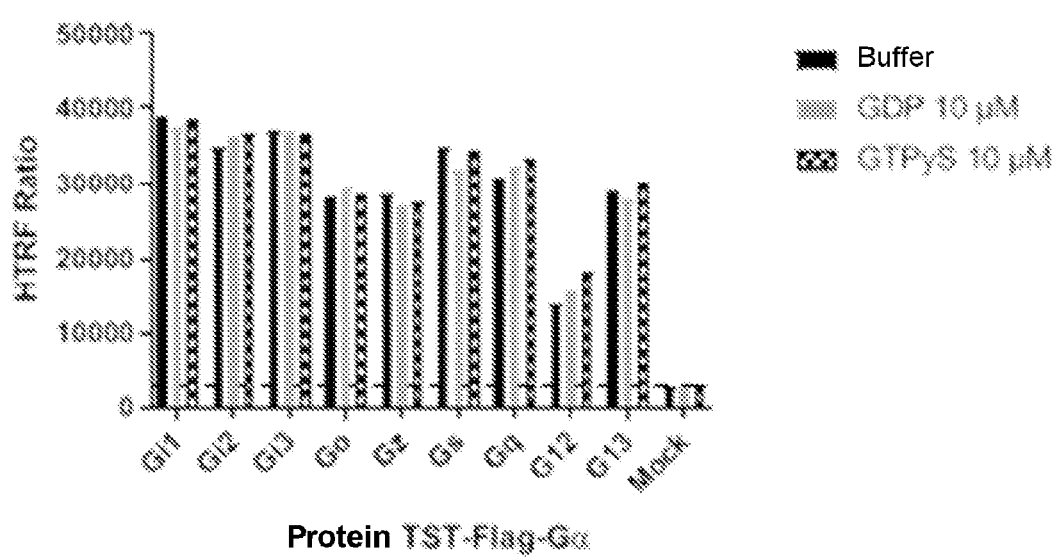
FIG. 9 is a diagram showing the FRET signal for different types of G-proteins α obtained with a pair of antibodies anti-Twin-Strep-tag-Lumi4 Tb/anti-FLAG-d2, which makes it possible to verify that all the G-proteins α encoded by the plasmids were indeed overexpressed in HEK293. In fact, the HTRF signal obtained with each of them was much higher than the HTRF signal obtained with the negative condition ("MOCK") that corresponds to HEK293's transfected with a control plasmid not coding for any tagged protein FLAG+ Twin-Strep-tag.
Figure 10:
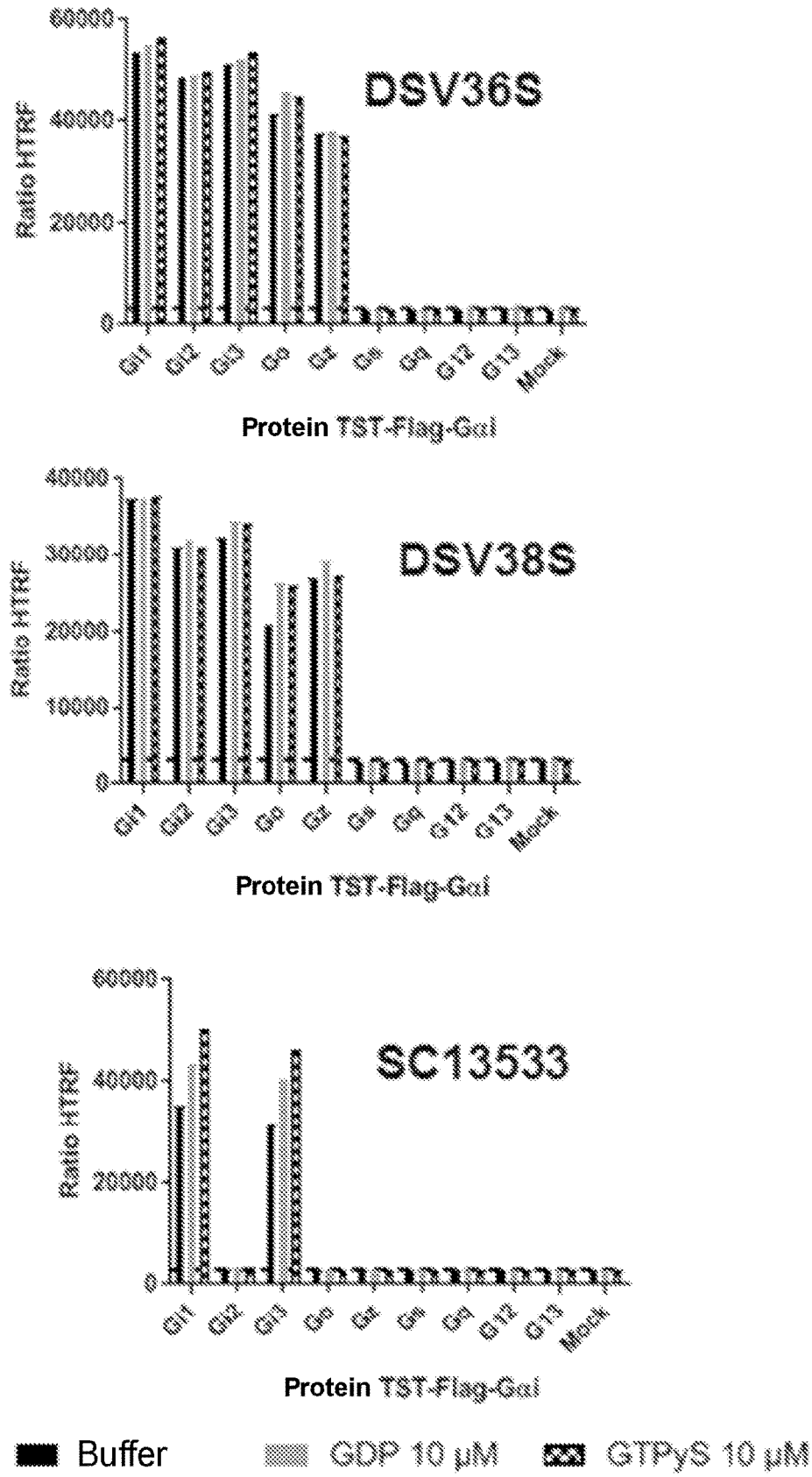
FIG. 10 is a diagram illustrating the selectivity of the antibodies DSV36S, DSV38S and SC13533 for the different types of G-proteins α. The antibodies DSV36S and DSV38S gave a positive HTRF signal when the proteins Gαi1, Gαi2, Gαi3, Gαo and Gαz were overexpressed but did not give an HTRF signal when the proteins Gαs, Gαq, Gα12 and Gα13 were overexpressed. The antibody SC13533 gave a positive HTRF signal when the proteins Gαi1 and Gαi3 were overexpressed but did not give an HTRF signal when the proteins Gαi2, Gαo, Gαz, Gαs, Gαq, Gα12 and Gα13 were overexpressed. These results confirm that the antibodies DSV36S and DSV38S recognize the same epitope on the G-proteins α (they have the same selectivity profile and are competitive). This epitope is different from that recognized by the antibody SC13533, which recognizes a smaller number of G-proteins α.

FIGS. 9 and 10 show the results obtained in this experiment.

The use of a pair of antibodies anti-Twin-Strep-tag-Lumi4 Tb/anti-FLAG-d2 makes it possible to verify that all the G-proteins α encoded by the plasmids were indeed overexpressed in HEK293. In fact, the HTRF signal obtained with each of them was much greater than the HTRF signal obtained with the negative condition ("MOCK"), which corresponds to HEK293 cells transfected with a control plasmid not coding for any tagged protein FLAG+Twin-Strep-tag.

The overexpression of all the G-proteins α having been validated, it was then possible to determine the selectivity profile of the antibodies DSV36S, DSV38S and SC 13533 by measuring a possible FRET between these antibodies labeled with d2 and the anti-Twin-Strep-tag-Lumi4 Tb antibody. The antibodies DSV36S and DSV38S gave a positive HTRF signal when the proteins Gαi1, Gαi2, Gαi3, Gαo and Gαz were overexpressed but did not give an HTRF signal when the proteins Gαs, Gαq, Gα12 and Gα13 were overexpressed. The antibody SC13533 gave a positive HTRF signal when the proteins Gαi1 and Gαi3, were overexpressed but did not give an HTRF signal when the proteins Gαi2, Gαo, Gαz, Gαs, Gαq, Gα12 and Gα13 were overexpressed. These results confirm that the antibodies DSV36S and DSV38S recognize the same epitope on the G-proteins α (they have the same selectivity profile and are competitive). This epitope is different than that recognized by the antibody SC13533, which recognizes a smaller number of G-proteins α.

Example 7: Capacity of the Antibodies DSV36S, DSV38S, DSV 26S, DSV 39S, DSV 3S and SC13533 to Generate a TR-FRET Signal When They Are Combined with a Fluorescent GTP Analog on Membrane Preparations Overexpressing a GPCR All the reagents were diluted in buffer TrisHCl 50 mM pH 7.4, MgCl2 10 mM, BSA 0.1%, NaCl 300 mM and 0.5 µM GDP. HEK293 membranes expressing the DOR receptor were prepared 4× for a final amount in the wells of 10 µg. The antibodies DSV36S-d2, DSV38S-d2, SC13533-d2 and anti-FLAG-d2 were prepared 4× for a final concentration in the wells of 10 nM. GTPgN-octyl-C2 labeled with a europium cryptate was prepared 4× to obtain a final concentration in the wells of 6 nM. GTPgO-linker-Cy5 was prepared 4× to obtain a final concentration in the wells of 50 nM. The nucleotides GTPgS and GDP were prepared 4× to obtain a final concentration in the wells of 100 µM. SNC 162 was prepared 4× to obtain a final concentration in the wells of 10 µM.

The reagents were distributed in the 384-well plates as follows:
1) 5 µl of DOR membranes was put in each well,
2) 5 µl of GTPgN-octyl-C2 labeled with europium cryptate or GTPgO-linker-Cy5 was added to each well, 3) 5 µl of antibody DSV36S or DSV38S or SC13533 or DSV 26S or DSV3S or DSV 39S labeled with d2 or DSV 36S or SC13533 labeled with terbium cryptate was added to each well, 4) 5 µl of buffer or SNC 162 or GTPgS was added to each well.

The plates were incubated for 20 h at room temperature before reading the HTRF signal.

The reaction scheme is illustrated in FIG. 8A.

Results

Figure 11:
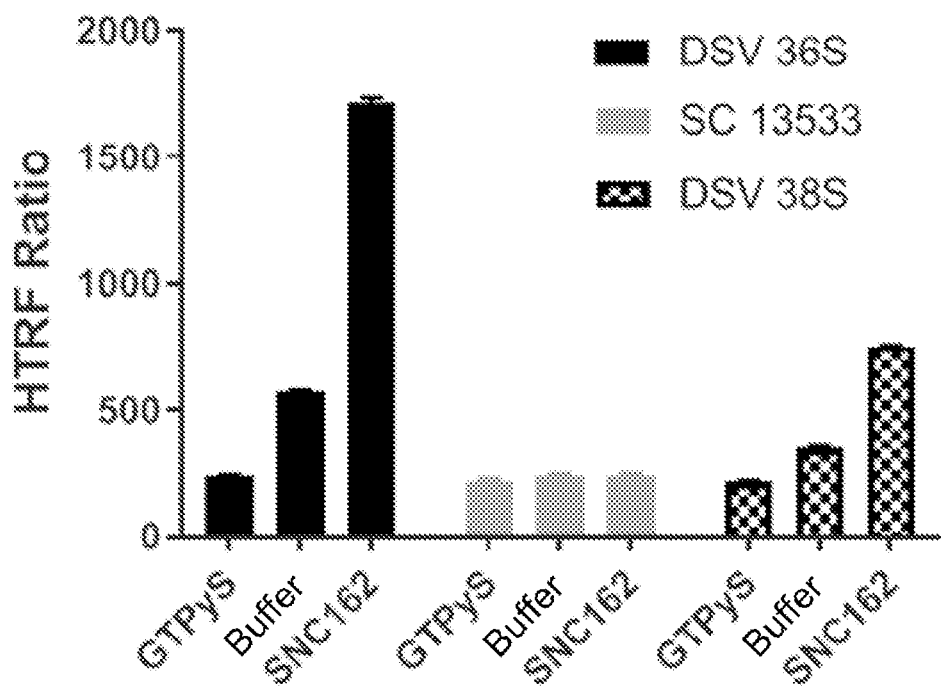
FIG. 11 is a diagram illustrating the capacity of the antibodies DSV36S, DSV38S and SC13533 to generate a TR-FRET signal when they are combined with a fluorescent GTP analog (GTPgN-octyl-C2-Europium cryptate) on membrane preparations overexpressing a GPCR. The condition "GTPgS" represents the nonspecific signal of the assay (NS) in which the excess of unlabeled GTPgS (100 µM) has inhibited the binding of GTPgN-octyl-C2-Europium cryptate on the G-proteins α and has therefore prevented the appearance of a FRET signal. The condition "buffer" showed that it was possible to obtain a moderate but significant FRET signal between Europium GTPgN-octyl-C2-cryptate and the antibodies DSV36S and DSV 38S labeled with d2. On adding SNC162, which caused activation of the DOR receptors overexpressed in the membranes, an increase of this FRET signal was observed, connected with an increase in binding of the fluorescent GTP analog on some or all of the proteins Gαi1, Gαi2, Gαi3, Gαo and Gαz recognized by the antibodies DSV36S and DSV38S. Conversely, despite its capacity for binding the proteins Gαi1 and Gαi3, which are expressed endogenously in HEK293 cells [2], the antibody SC 13533 did not give any FRET signal when it was combined with GTPgN-octyl-C2-Europium cryptate, whether in the absence or in the presence of SNC162. These results confirm that only the antibodies according to the invention were capable of generating a FRET signal.

FIG. 11 shows the results obtained when the analog GTPgN-octyl-C2-Europium cryptate is combined with the antibodies DSV36S-d2, DSV38S-d2 and SC13533-d2. The condition "GTPgS" represents the nonspecific signal of the assay (NS) in which the excess of unlabeled GTPgS (100 µM) inhibited binding of Europium GTPgN-octyl-C2-cryptate on the G-proteins a and therefore prevented the appearance of a FRET signal. The condition "buffer" showed that it was possible to obtain a moderate but significant FRET signal between Europium GTPgN-octyl-C2-cryptate and the antibodies DSV36S and DSV 38S labeled with d2. On adding SNC162, which caused activation of the DOR receptors overexpressed in the membranes, an increase of this FRET signal was observed, connected with an increase in binding of the fluorescent GTP analog on some or all of the proteins Gαi1, Gαi2, Gαi3, Gαo and Gαz recognized by the antibodies DSV36S and DSV38S. Conversely, despite its capacity for binding the proteins Gαi1 and Gαi3, which are expressed endogenously in HEK293 cells [2], the antibody SC 13533 did not give any FRET signal when it was combined with GTPgN-octyl-C2-Europium cryptate, whether in the absence or in the presence of SNC162.

Figure 12:
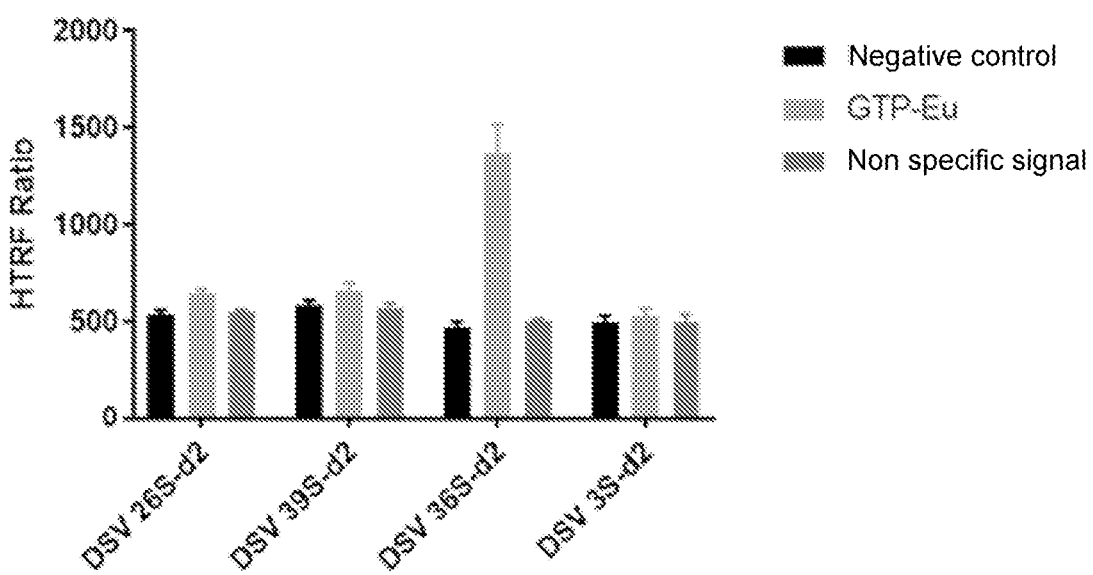
FIG. 12 shows the capacity of the antibodies DSV 36S, DSV 26S, DSV 3S and DSV 39S for generating a TR-FRET signal when they are combined with a fluorescent GTP analog (Europium GTPgN-octyl-C2-cryptate) on unactivated membrane preparations overexpressing a GPCR. The condition "Nonspecific signal" showed that a weak baseline FRET signal between the fluorescent GTP analog and the antibodies labeled with d2 was detected. The condition "Negative control" represents the nonspecific signal of the assay in which the excess of unlabeled GTPgS (100 µM) inhibited binding of the fluorescent GTP analog on the G-proteins α and therefore prevented the appearance of a FRET signal. The inhibition measured was total since the level of the HTRF signal measured for the conditions "Nonspecific signal" and "Negative control" is almost identical. On adding the fluorescent GTP analog and the antibodies, an increase of the FRET signal connected with an increase in binding of the fluorescent analogs of GTP on some or all of the proteins Gαi1, Gαi2, Gαi3, Gαo and Gαz recognized by the antibody DSV36S was measured. Conversely, despite their capacity for binding the G-proteins αi in HEK293 cells, the antibodies DSV 26S, DSV 3S and DSV 39S did not give any FRET signal when they were combined with Europium GTPgN-octyl-C2-cryptate. In conclusion, these results confirm that only the antibodies described according to the invention were capable of generating a FRET signal.

In the same way, FIG. 12 shows the results obtained when the analog Europium GTPgN-octyl-C2-cryptate is combined with the antibodies DSV36S-d2, DSV26S-d2, DSV39S-d2 and DSV3S-d2 on unactivated membrane preparations overexpressing a GPCR. The condition "Nonspecific signal" showed that a weak baseline FRET signal between the fluorescent GTP analog and the antibodies labeled with d2 was detected. The condition "Negative control" represents the nonspecific signal of the assay in which the excess of unlabeled GTPgS (100 µM) inhibited binding of the fluorescent GTP analog on the G-proteins α and therefore prevented the appearance of a FRET signal. The inhibition measured was total since the level of the HTRF signal measured for the conditions "Nonspecific signal" and "Negative control" is almost identical. On adding the fluorescent GTP analog and the antibodies, an increase of the FRET signal connected with an increase in binding of the fluorescent analogs of GTP on some or all of the proteins Gαi1, Gαi2, Gαi3, Gαo and Gαz recognized by the antibody DSV36S was measured. Conversely, despite their capacity for binding the G-proteins αi in the HEK293 cells [2], the antibodies DSV 26S, DSV 3S and DSV 39S did not give any FRET signal when they were combined with Europium GTPgN-octyl-C2-cryptate.

Figure 13:
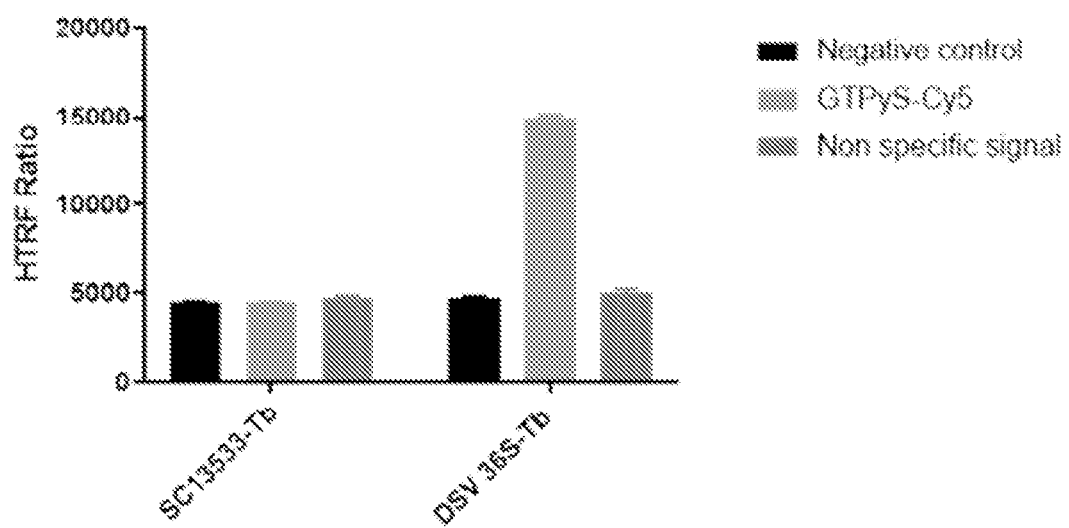
FIG. 13 shows the capacity of the antibodies DSV 36S and sc-13533 to generate a TR-FRET signal when combined with a fluorescent GTP analog (GTPgO-Linker-Cy5(P)) on unactivated membrane preparations overexpressing a GPCR. The condition "Nonspecific signal" showed that a weak baseline FRET signal between the fluorescent GTP analog and the antibodies labeled with terbium cryptate was detected. The condition "Negative control" represents the nonspecific signal of the assay in which the excess of unlabeled GTPgS (100 µM) inhibited binding of the fluorescent GTP analog on the G-proteins α and therefore prevented the appearance of a FRET signal. The inhibition measured was total since the level of the HTRF signal measured for the conditions "Nonspecific signal" and "Negative control" is almost identical. On adding the fluorescent GTP analog and the antibodies, an increase of the FRET signal connected with an increase in binding of the fluorescent GTP analog on some or all of the proteins Gαi1, Gαi2, Gαi3, Gαo and Gαz recognized by the antibody DSV36S was measured. Conversely, despite its capacity for binding the proteins Gαi1 and Gαi3, which are expressed endogenously in HEK293 cells, the antibody sc-13533 did not give any FRET signal when it was combined with GTPgO-Linker-Cy5(P). In conclusion, only the antibodies described according to the invention were capable of generating a FRET signal.

FIG. 13 shows the results obtained when the analog GTPgO-linker-Cy5 is combined with the antibodies DSV36S-Tb and SC13533-Tb on unactivated membrane preparations overexpressing a GPCR. The condition "Nonspecific signal" showed that a weak baseline FRET signal between the fluorescent analogs of GTP and the antibodies labeled with terbium cryptate was detected. The condition "Negative control" represents the nonspecific signal of the assay in which excess of unlabeled GTPgS (100 µM) inhibited binding of the fluorescent GTP analog on the G-proteins α and therefore prevented the appearance of a FRET signal. The inhibition measured was total since the level of the HTRF signal measured for the conditions "Nonspecific signal" and "Negative control" is almost identical. On adding the fluorescent GTP analog and the antibodies, an increase of the FRET signal connected with an increase in binding of the fluorescent GTP analog on some or all of the proteins Gαi1, Gαi2, Gαi3, Gαo and Gαz recognized by the antibody DSV36S was measured. Conversely, despite its capacity for binding the proteins Gαi1 and Gαi3, which are expressed endogenously in HEK293 cells [2], the antibody sc-13533 did not give any FRET signal when it was combined with GTPgO-Linker-Cy5(P).

Taken together, these results confirm that only the antibodies according to the invention were capable of generating a FRET signal.

Example 8: Measurement of the Activation of a GPCR by Carrying Out a FRET with a Labeled Antibody According to the Invention Materials The cell membrane preparations expressing the receptors under investigation and the G-protein alphai were purchased from Perkin Elmer or Euroscreen. The following table lists the base cells and references of the different samples used:

TABLE 2

|  | Base cell | Supplier | Reference |
| --- | --- | --- | --- |
| Delta Opioid | HEK293 | Perkin Elmer | 6110549400UA |
| Delta Opioid | CHO-K1 | Euroscreen | Service |
| Dopamine D2S | CHO-K1 | Euroscreen | Service |

The antibody DSV36S was labeled with the fluorescent probes compatible for TR-FRET detection (red acceptor—d2 or donor Lumi4Tb).

The nucleotides GTP, GDP and GTPγS were purchased from Sigma Aldrich (respective catalog references G8877, G7127 and G8634).

The agonists of the Delta Opioid GPCRs (SNC162) and Dopamine D2S (PPHT) and the antagonist of the Delta Opioid GPCR (Naltrindole) were purchased from Tocris (respective catalog references 1529 and 0740).

The 384-well Low volume plates, white with white bottom, were purchased from Greiner Bio One (Catalog reference 784075).

The nonhydrolyzable/slowly hydrolyzable GTP analogs labeled with donor or acceptor fluorophors (GTPgN-C2; GTPgN-C3; GTPgN-octyl-C2; GTPgN-octyl-C11; GTPgN-octyl-C3; GTPgO-hexyl-C2; GTPgO-hexyl-C3; GTP-gN-octyl-thiosuccinimidyl-C2; GTPgN-octyl-Cy5; GTPgN-octyl-AF488) were synthesized by Cisbio Bioassays.

The nonhydrolyzable/slowly hydrolyzable GTP analogs labeled with acceptor fluorophors GTPgO-Linker-Cy5(P) and GTPgS-Linker-Cy5(R) were purchased from Jena Bioscience under the respective references NU-834-CY5 and NU-1610-CY5.

Method

Preparation of the Reagents

All the reagents were diluted in buffer TrisHCl 50 mM pH 7.4, MgCl2 10 mM, BSA 0.1%, NaCl 10 mM or 100 mM or 300 mM or 500 mM (concentration specified in the legend of each figure), 0 or 0.5 or 1 µM GDP (concentration specified in the legend of each figure). The membranes were prepared 4× for distributing 1 or 10 µg/well (amount specified in the legend of each figure). The nucleotide GTPgS (condition: nonspecific signal) was prepared 6.67× to obtain a final concentration in the wells of 100 µM. The test compounds (agonists or antagonists) were prepared 10× to obtain the final concentrations in the wells stated in the diagram. The anti-G alphai antibodies used for detection were prepared 4× for the following final concentrations in the wells: antibody DSV36S-d2 (10 nM); antibody DSV36S-Lumi4Tb (0.5 or 1 nM); antibody DSV38S-d2 (10 nM). The nonhydrolyzable/slowly hydrolyzable GTP analogs labeled with donor or acceptor fluorescent probes were prepared 4× for the final concentrations in the wells stated in the legends of each figure.

Distribution of the reagents in the 384-well plates:
Membranes expressing GPCR and G-protein alphai: 5 µL
Buffer or nucleotide GTPgS (for the condition nonspecific signal): 3 µL
Nonhydrolyzable/slowly hydrolyzable GTP analog—donor or acceptor: 5 µL
Anti G alphai antibody—donor or acceptor: 5 µL
Buffer or Test Compounds (agonists and/or antagonists): 2 µL.

The nonspecific signal (fluorescence background noise) was measured with wells containing an excess of GTPgS (100 µM).

Reading the HTRF Signal

The plates were incubated at 21° C. for 20 h (unless otherwise specified in the figures) and then the HTRF signal was measured on the PHERAstar reader (BMG Labtech) with the following configuration:
Module: HTRF (Excitation 337 nm, Emission 665 nm and 620 nm)
Excitation: laser, 40 flashes or lamp, 100 flashes
Reading window: delay: 60 µs-Integration: 400 µs.

Processing the Signal

The HTRF ratio was calculated from the raw signals at 665 nm (for red acceptor-Cy5) or 520 nm (for green acceptors—AF488 or Fluorescein) and 620 nm, according to the following formula:

HTRF ratio=Signal at 665 nm or Signal at 520 nm/Signal at 620 nm*10,000.

Assay Formats

Figure 14:
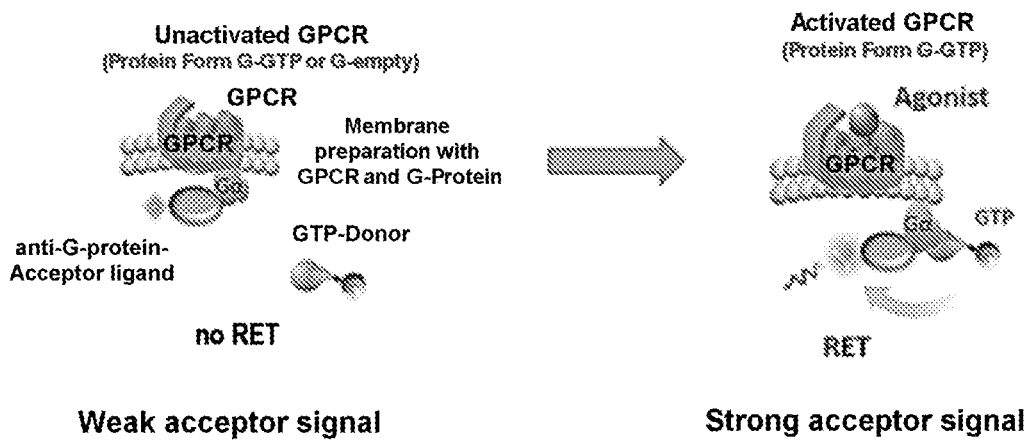
FIGS. 14A and 14B illustrate 2 formats of FRET that can be used with the antibodies according to the invention (Formats 2A and 2B).
Figure 14:
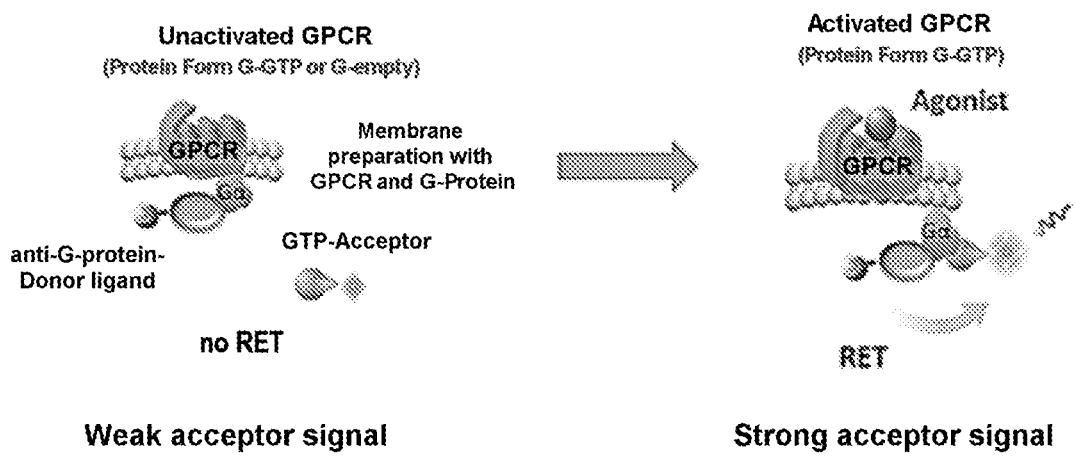

FIG. 14A illustrates the assay principle using a nonhydrolyzable/slowly hydrolyzable GTP analog labeled with a donor RET partner and an anti G-protein alpha antibody labeled with an acceptor RET partner in which activation of the GPCR with an agonist compound induces an increase in binding of the donor GTP analog to the G-protein and therefore an increase of the RET signal (format 2A).

FIG. 14B illustrates the assay principle using a nonhydrolyzable/slowly hydrolyzable GTP analog labeled with an acceptor RET partner and an anti G-protein alpha antibody labeled with a donor RET partner in which activation of the GPCR with an agonist compound induces an increase in binding of the acceptor GTP analog to the G-protein and therefore an increase of the RET signal (format 2B).

Figure 15:
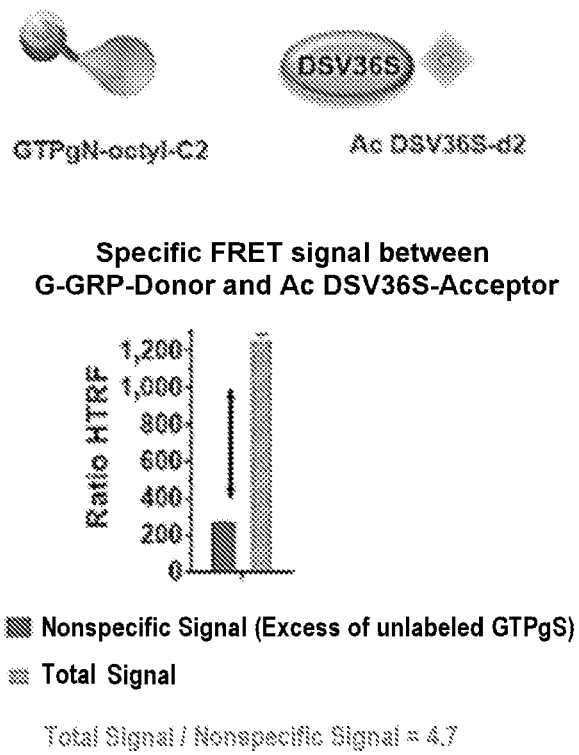
FIGS. 15A and 15B illustrate an activation assay according to format 2A on Delta Opioid GPCR with the detection pair: GTPgN-octyl-C2+DSV36S-d2.
Figure 15:
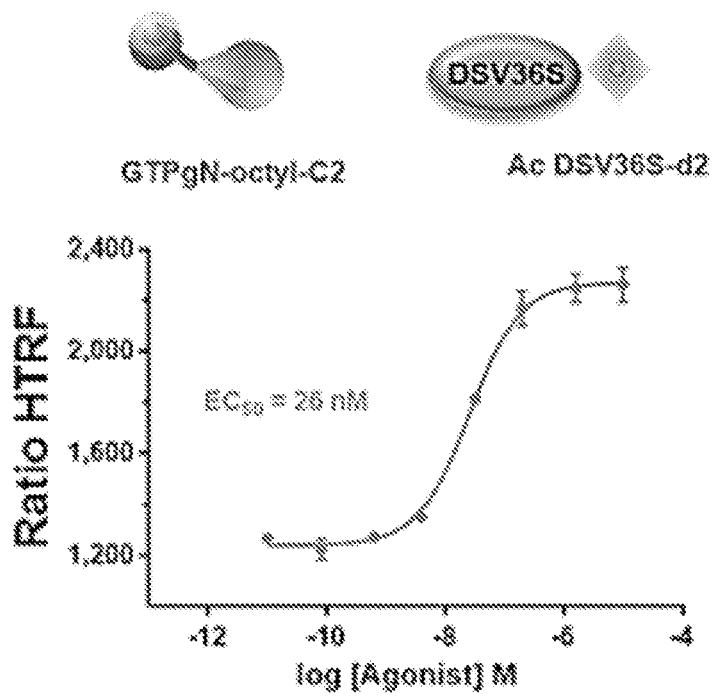

Activation Assay According to Format 2A on Delta Opioid GPCR (DOR): Increase of the TR-FRET Signal Between Donor GTP and Acceptor Anti-G-Protein Alphai Antibody Under Stimulation of an Agonist Firstly, the capacity of the donor GTP/acceptor anti-G alphai antibody pairs to generate a specific TR-FRET signal by binding to the G-protein was demonstrated using CHO-K1 cell membrane preparations expressing Delta Opioid GPCR and G-protein alphai. The following experimental conditions were used:

FIG. 15A: GTPgN-octyl-C2 (final 6 nM in the well); DSV36S-d2 (final 10 nM in the well); 10 µg CHO-DOR membranes/well; Buffer: TrisHCl 50 mM pH7.4; MgCl2 10 mM; NaCl 500 mM; BSA 0.1%.

Figure 16:
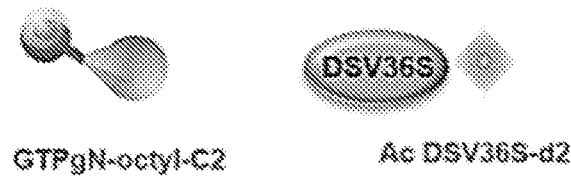
FIGS. 16A and 16B illustrate an activation assay according to format 2A on Delta Opioid GPCR with the detection pair: GTPgN-octyl-C2+DSV36S-d2.
Figure 16:
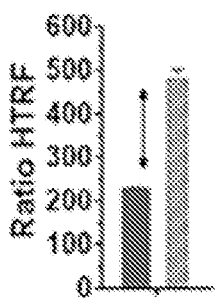
Figure 16:
Figure 16:
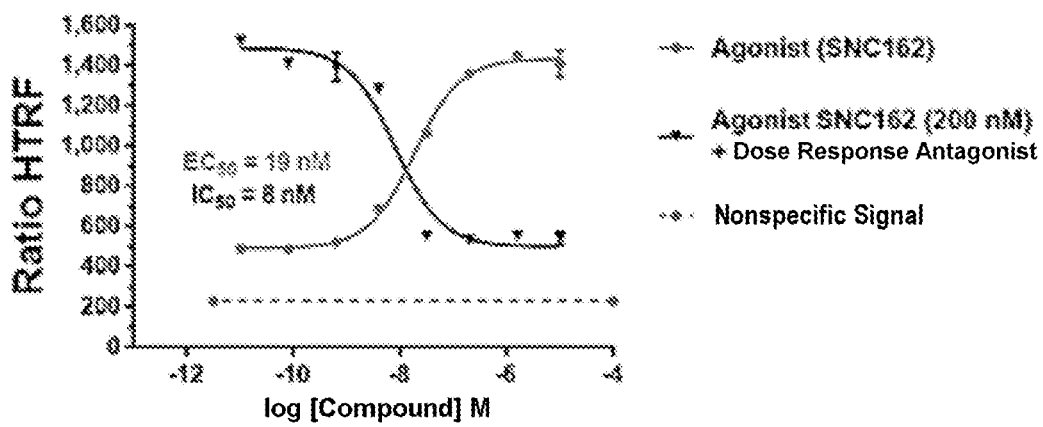

FIG. 16A: GTPgN-octyl-C2 (final 6 nM in the well); DSV36S-d2 (final 10 nM in the well); 10 µg CHO-DOR membranes/well; Buffer: TrisHCl 50 mM pH7.4; MgCl2 10 mM; NaCl 300 mM; GDP 0.5 µM; BSA 0.1%.

Figure 17A:
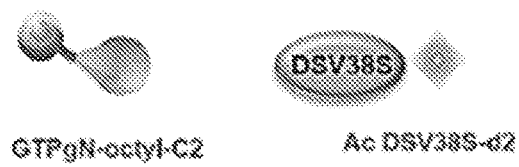
FIGS. 17A and 17B illustrate an activation assay according to format 2A on Delta Opioid GPCR with the detection pair: GTPgN-octyl-C2+DSV38S-d2.
Figure 17A:
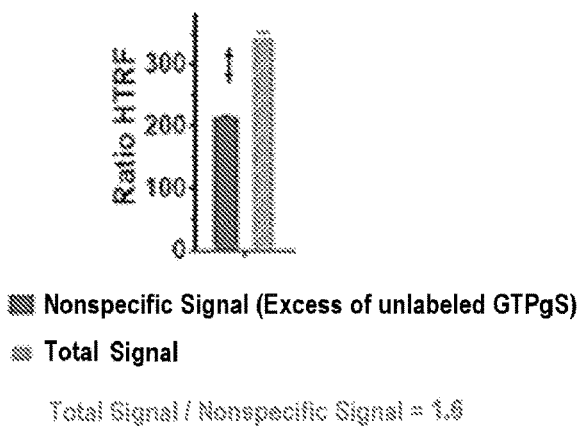
Figure 17B:
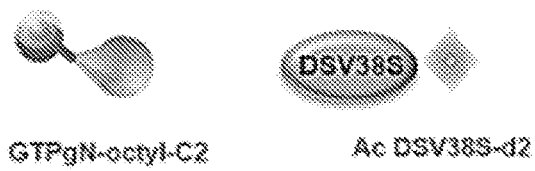
Figure 17B:
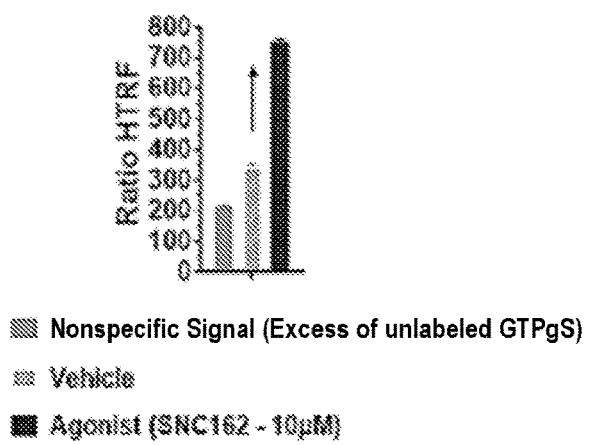

FIG. 17A: GTPgN-octyl-C2 (final 6 nM in the well); DSV38S-d2 (final 10 nM in the well); 10 µg CHO-DOR membranes/well; Buffer: TrisHCl 50 mM pH7.4; MgCl2 10 mM; NaCl 300 mM; GDP 0.5 µM; BSA 0.1%.

Figure 18A:
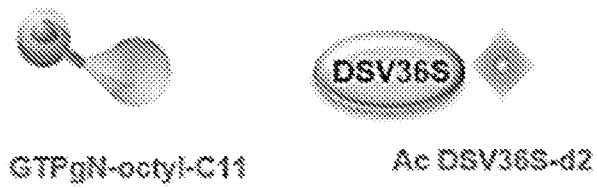
FIGS. 18A and 18B illustrate an activation assay according to format 2A on Delta Opioid GPCR with the detection pair: GTPgN-octyl-C11+DSV36S-d2.
Figure 18A:
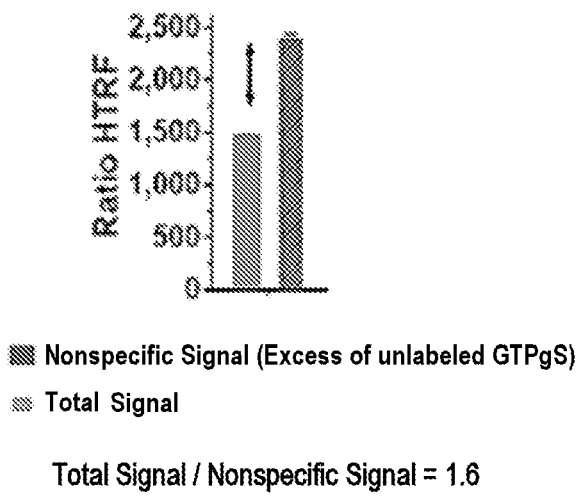
Figure 18B:
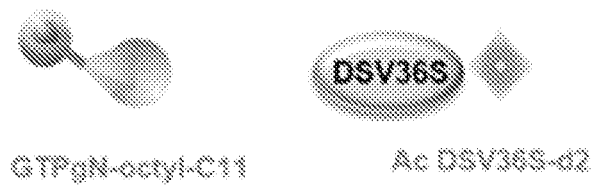
Figure 18B:
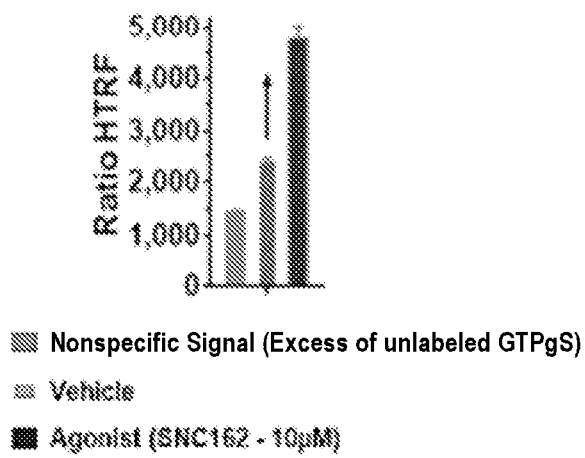

FIG. 18A: GTPgN-octyl-C11 (final 6 nM in the well); DSV36S-d2 (final 10 nM in the well); 10 µg CHO-DOR membranes/well; Buffer: TrisHCl 50 mM pH7.4; MgCl2 10 mM; NaCl 300 mM; GDP 0.5 µM; BSA 0.1%.

Figure 19A:
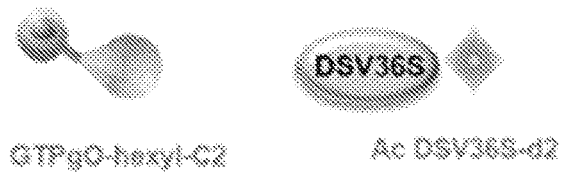
FIGS. 19A and 19B illustrate an activation assay according to format 2A on Delta Opioid GPCR with the detection pair: GTPgO-hexyl-C2+DSV36S-d2.
Figure 19A:
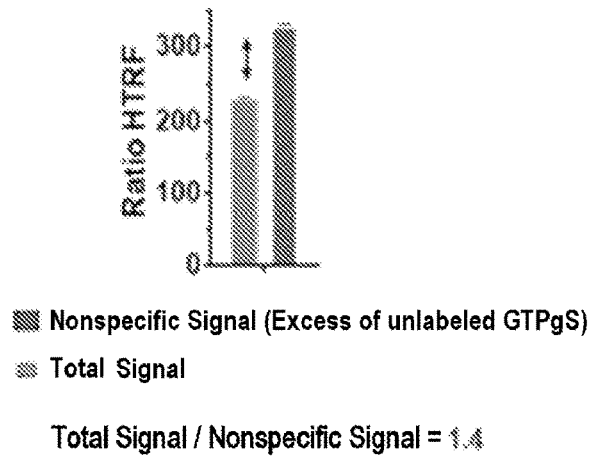
Figure 19B:
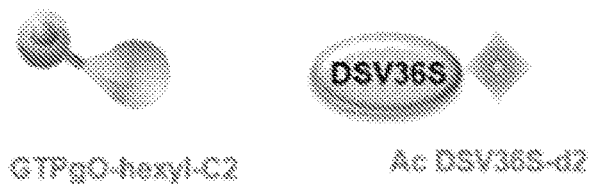
Figure 19B:
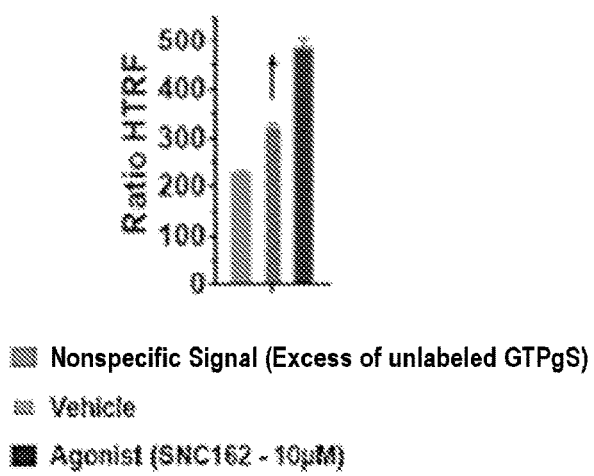

FIG. 19A: GTPgO-hexyl-C2 (final 6 nM in the well); DSV36S-d2 (final 10 nM in the well); 10 µg CHO-DOR membranes/well; Buffer: TrisHCl 50 mM pH7.4; MgCl2 10 mM; NaCl 300 mM; GDP 0.5 µM; BSA 0.1%.

Figure 20A:
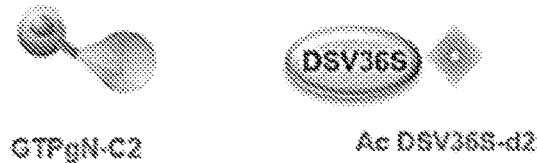
FIGS. 20A and 20B illustrate an activation assay according to format 2A on Delta Opioid GPCR with the detection pair: GTPgN-C2+DSV36S-d2.
Figure 20A:
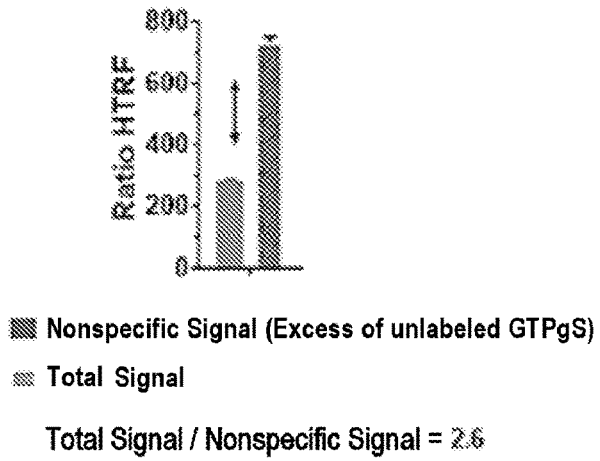
Figure 20B:
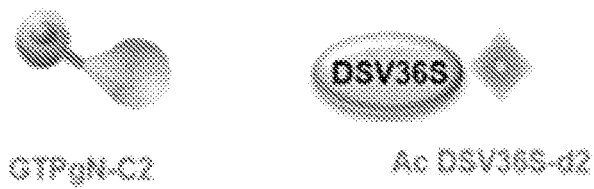
Figure 20B:
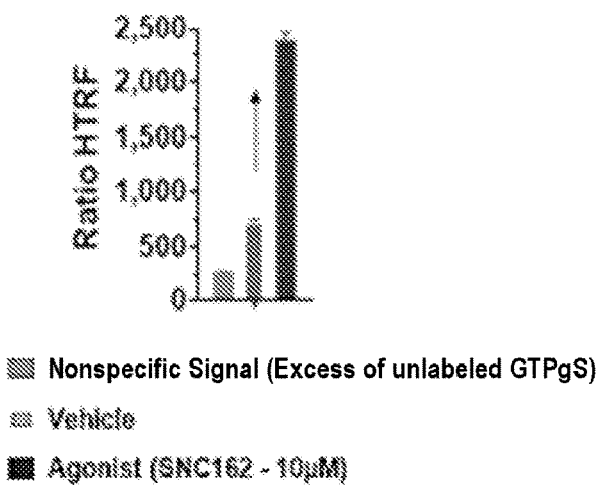

FIG. 20A: GTPgN-C2 (final 6 nM in the well); DSV36S-d2 (final 10 nM in the well); 10 µg CHO membranes-DOR/well; Buffer: TrisHCl 50 mM pH7.4; MgCl2 10 mM; NaCl 300 mM; GDP 0.5 µM; BSA 0.1%.

The membranes were incubated in the absence or in the presence of a large excess of GTPgS (100 µM). The difference in TR-FRET signal (HTRF ratio) observed between these two conditions shows that the analogs GTPgN-octyl-C2, GTPgN-octyl-C11, GTPgO-hexyl-C2, GTPgN-C2 are capable of binding to G-protein alphai and generating a TR-FRET signal with the acceptor anti G alphai antibody (FIGS. 16A to 20A).

Secondly, the capacity of an agonist of GPCR to modulate the proportion of G-protein alpha bound to the donor GTP was tested with the same membranes and experimental conditions as mentioned above. The increase in TR-FRET signal (HTRF ratio) generated by stimulation with the agonist indicates that the proportion of the G-protein alpha form bound to the donor GTP increases (i.e. the empty form of G-protein alpha decreases). Thus, the GPCR receptor activated by its agonist leads to binding of the donor GTP to the G-protein, which then changes to the donor GTP form and leads to an increase in the TR-FRET signal. These results are shown in FIGS. 15B, 16B, 17B, 18B, 19B and 20B. Moreover, FIG. 16B shows a second condition in which activation by a fixed concentration of agonist of GPCR SNC162 (200 nM) was inhibited by an increasing concentration of antagonist of GPCR (Naltrindole). This inhibition of activation is observed from the decrease in TR-FRET signal (HTRF ratio).

Figure 21A:
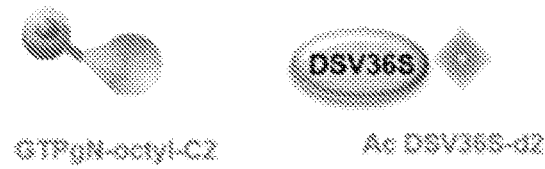
FIGS. 21A and 21B illustrate an activation assay according to format 2A on GPCR Dopamine D2S with the detection pair: GTPgN-octyl-C2+DSV36S-d2.
Figure 21A:
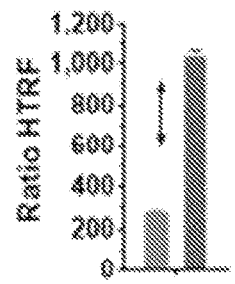

Activation Assay According to Format 2A on GPCR Dopamine D2S (D2S): Increase in TR-FRET Signal Between Donor GTP and Acceptor Anti-G-Protein Alphai Antibody Under Stimulation of an Agonist Firstly, the capacity of the donor GTP/acceptor anti-G alphai antibody pairs to generate a specific TR-FRET signal by binding to the G-protein was demonstrated using CHO-K1 cell membrane preparations expressing GPCR Dopamine D2S and G-protein alphai. The following experimental conditions were used:

FIG. 21A: GTPgN-octyl-C2 (final 6 nM in the well); DSV36S-d2 (final 10 nM in the well); 10 µg CHO-D2S membranes/well; Buffer: TrisHCl 50 mM pH7.4; MgCl2 10 mM; NaCl 10 mM; GDP 1 µM; BSA 0.1%.

Figure 22A:
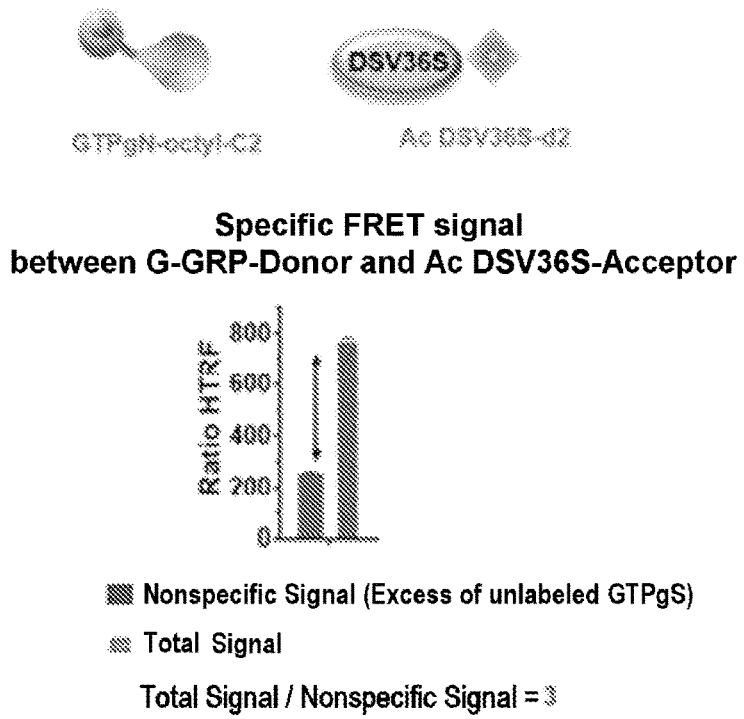
FIGS. 22A and 22B illustrate an activation assay according to format 2A on GPCR Dopamine D2S with the detection pair: GTPgN-octyl-C2+DSV36S-d2.

FIG. 22A: GTPgN-octyl-C2 (final 6 nM in the well); DSV36S-d2 (final 10 nM in the well); 10 µg CHO-D2S membranes/well; Buffer: TrisHCl 50 mM pH7.4; MgCl2 10 mM; NaCl 100 mM; BSA 0.1%.

Figure 23A:
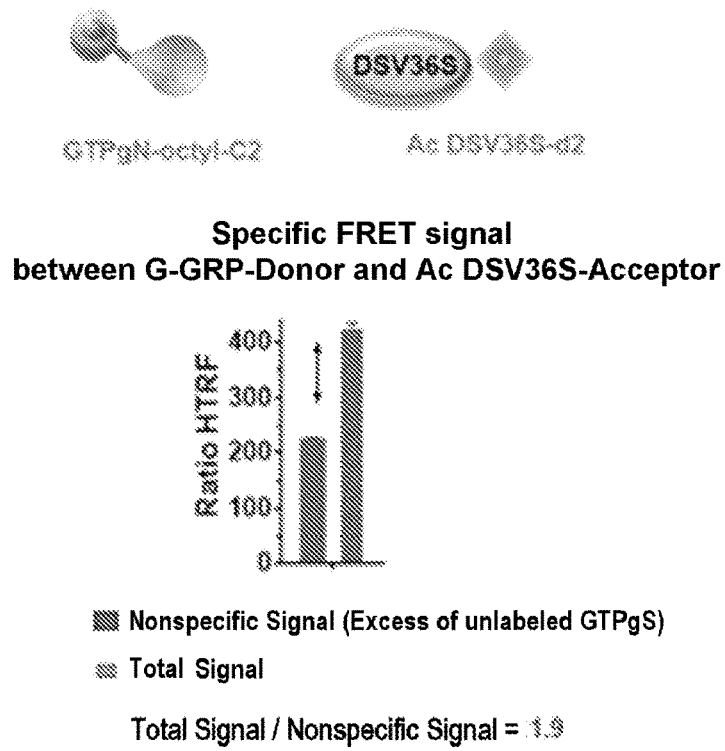
FIGS. 23A and 23B illustrate an activation assay according to format 2A on GPCR Dopamine D2S with the detection pair: GTPgN-octyl-C2+DSV36S-d2.

FIG. 23A: GTPgN-octyl-C2 (final 6 nM in the well); DSV36S-d2 (final 10 nM in the well); 10 µg CHO-D2S membranes/well; Buffer: TrisHCl 50 mM pH7.4; MgCl2 10 mM; NaCl 100 mM; GDP 1 µM; BSA 0.1%.

The membranes were incubated in the absence or in the presence of a large excess of GTPgS (100 µM). The difference in TR-FRET signal (HTRF ratio) observed between these two conditions shows that the analog GTPgN-octyl-C2 is capable of binding to G-protein alphai and generating a TR-FRET signal with the acceptor anti G alphai antibody (FIGS. 21A to 23A).

Figure 21B:
Figure 21B:
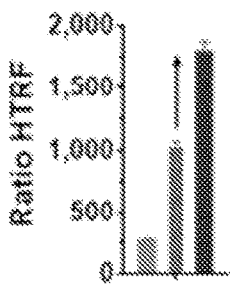
Figure 22B:
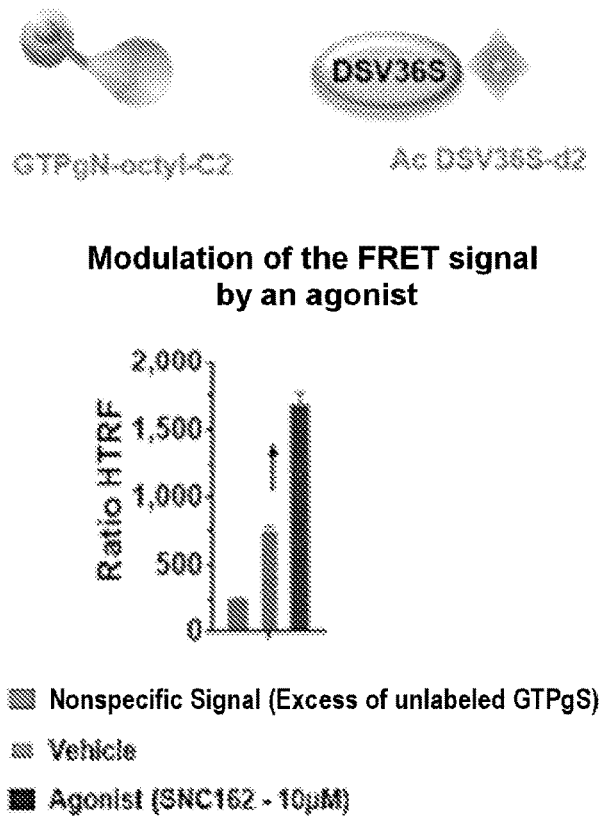
Figure 23B:
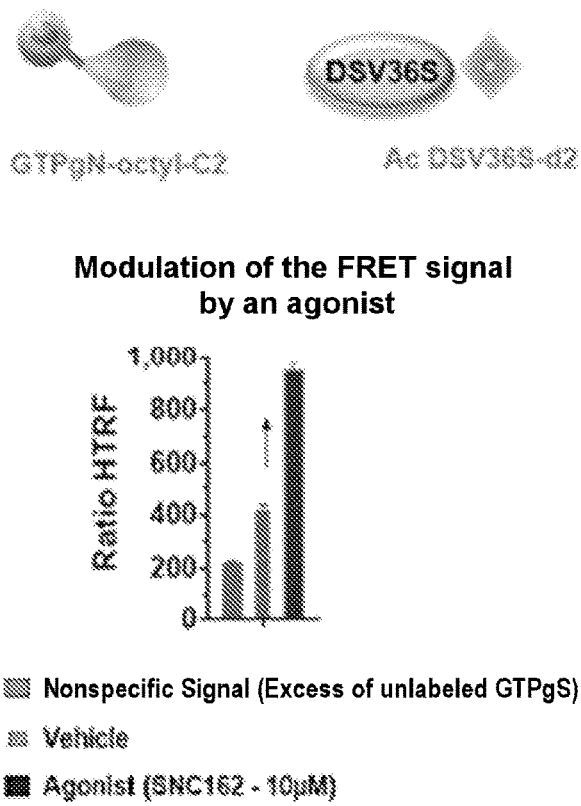

Secondly, the capacity of an agonist of GPCR to modulate the proportion of G-protein alpha bound to the donor GTP was tested with the same membranes and experimental conditions as mentioned above. The increase in TR-FRET signal (HTRF ratio) generated by stimulation with the agonist indicates that the proportion of the G-protein alpha form bound to the donor GTP increases (i.e. the empty form of G-protein alpha decreases). Thus, the GPCR receptor activated by its agonist leads to binding of the donor GTP to the G-protein, which then changes to the donor GTP form and leads to an increase in the TR-FRET signal. These results are shown in FIGS. 21B, 22B and 23B.

Figure 24A:
FIGS. 24A and 24B illustrate an activation assay according to format 2B on Delta Opioid GPCR with the detection pair: GTPgN-octyl-Cy5+DSV36S-Lumi4Tb.
Figure 24A:
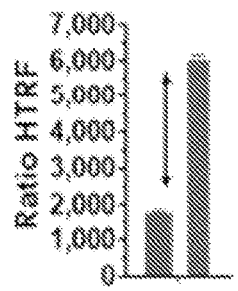

Activation Assay According to Format 2B on Delta Opioid GPCR (DOR): Increase in TR-FRET Signal Between GTP-Acceptor and Donor Anti-G-Protein Alphai Antibody Under Stimulation of an Agonist Firstly, the capacity of acceptor GTP/donor anti-G alphai antibody pairs to generate a specific TR-FRET signal by binding to the G-protein was demonstrated using CHO-K1 cell membrane preparations expressing Delta Opioid GPCR and G-protein alphai. The following experimental conditions were used:

FIG. 24A: GTPgN-octyl-Cy5 (final 50 nM in the well); DSV36S-Lumi4Tb (final 1 nM in the well); 10 µg CHO-DOR membranes/well; Buffer: TrisHCl 50 mM pH7.4; MgCl2 10 mM; NaCl 300 mM; GDP 0.5 µM; BSA 0.1%. Reading after incubation for 3 h at 21° C.

Figure 25A:
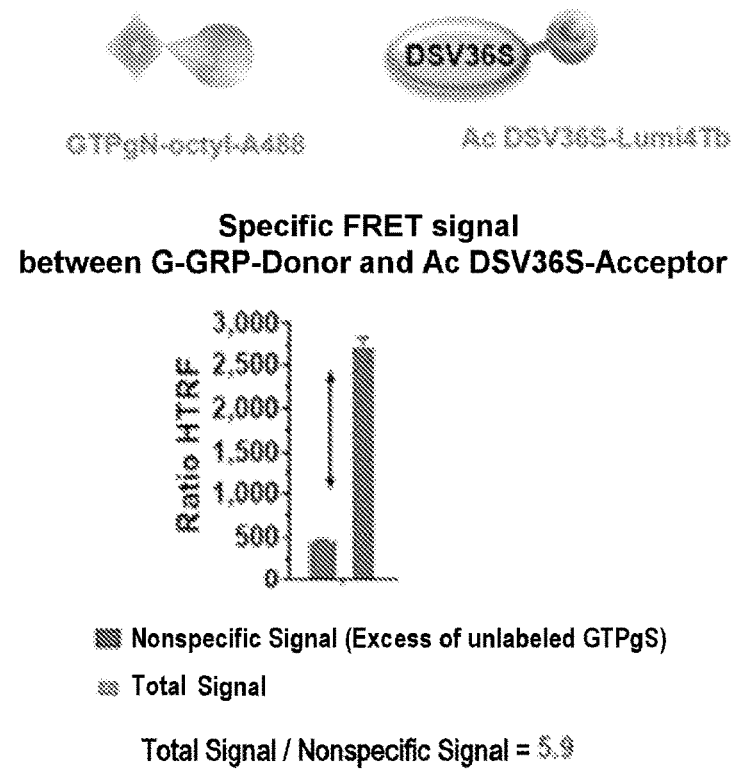
FIGS. 25A and 25B illustrate an activation assay according to format 2B on Delta Opioid GPCR with the detection pair: GTPgN-octyl-AF488+DSV36S-Lumi4Tb.

FIG. 25A: GTPgN-octyl-AF488 (final 50 nM in the well); DSV36S-Lumi4Tb (final 1 nM in the well); 10 µg CHO-DOR membranes/well; Buffer: TrisHCl 50 mM pH7.4; MgCl2 10 mM; NaCl 300 mM; GDP 0.5 µM; BSA 0.1%. Reading after incubation for 3 h at 21° C.

The membranes were incubated in the absence or in the presence of a large excess of GTPgS (100 µM). The difference in TR-FRET signal (HTRF ratio) observed between these two conditions shows that the analogs GTPgN-octyl-Cy5 and GTPgN-octyl-AF488 are capable of binding to G-protein alphai and generating a TR-FRET signal with the donor anti G alphai antibody (FIGS. 24A to 25A).

Figure 24B:
Figure 24B:
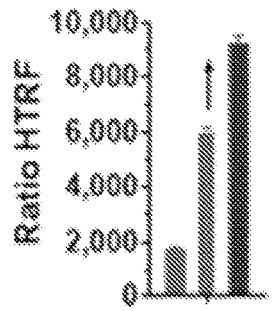
Figure 25B:
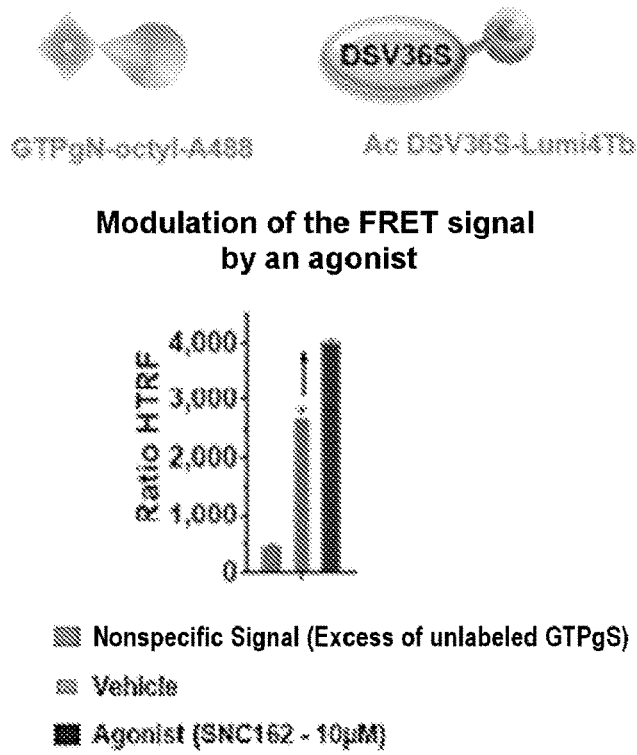

Secondly, the capacity of an agonist of GPCR to modulate the proportion of G-protein alpha bound to the acceptor GTP was tested with the same membranes and experimental conditions as mentioned above. The increase in TR-FRET signal (HTRF ratio) generated by stimulation with the agonist indicates that the proportion of the G-protein alpha form bound to the acceptor GTP increases (i.e. the empty form of G-protein alpha decreases). Thus, the GPCR receptor activated by its agonist leads to binding of the acceptor GTP to the G-protein, which then changes to the acceptor GTP form and leads to an increase in the TR-FRET signal. These results are shown in FIGS. 24B and 25B.

Figure 26A:
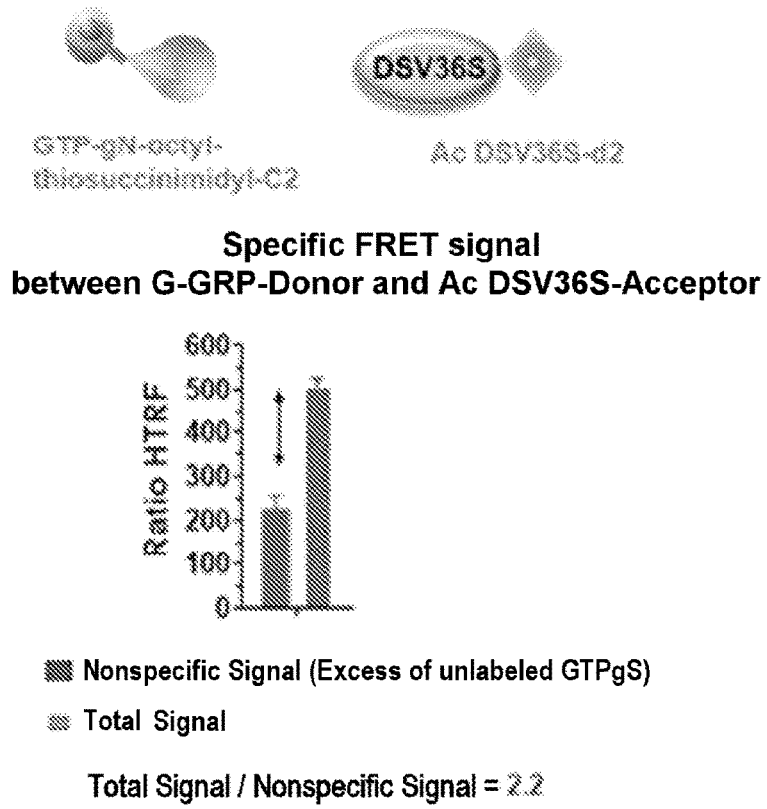
FIGS. 26A and 26B illustrate an activation assay according to format 2A on Delta Opioid GPCR with the detection pair: GTP-gN-octyl-thiosuccinimidyl-C2+DSV36S-d2.

Activation Assay According to Format 2A on Delta Opioid GPCR (DOR): Increase in TR-FRET Signal Between Donor GTP and Acceptor Anti-G-Protein Alphai Antibody Under Stimulation of an Agonist Firstly, the capacity of donor GTP/acceptor anti-G alphai antibody pairs to generate a specific TR-FRET signal by binding to the G-protein was demonstrated using CHO-K1 cell membrane preparations expressing Delta Opioid GPCR and G-protein alphai. The following experimental conditions were used:

FIG. 26A: GTP-gN-octyl-thiosuccinimidyl-C2 (final 7.5 nM in the well); DSV36S-d2 (final 10 nM in the well); 10 µg CHO-DOR membranes/well; Buffer: TrisHCl 50 mM pH7.4; MgCl2 60 mM; NaCl 150 mM; BSA 0.1%.

The membranes were incubated in the absence or in the presence of a large excess of GTPgS (100 µM). The difference in TR-FRET signal (HTRF ratio) observed between these two conditions shows that the analog GTP-gN-octyl-thiosuccinimidyl-C2 is capable of binding to G-protein alphai and generating a TR-FRET signal with the acceptor anti G alphai antibody (FIG. 26A).

Figure 26B:
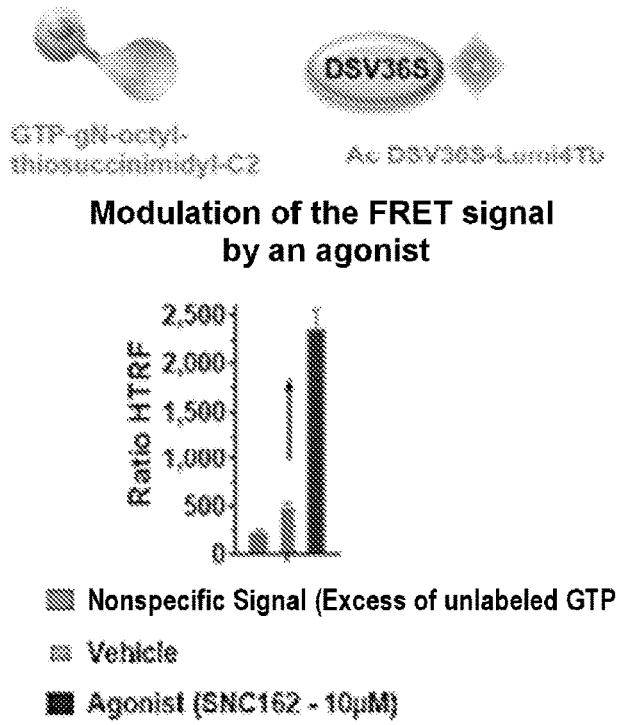

Secondly, the capacity of an agonist of GPCR to modulate the proportion of G-protein alpha bound to the donor GTP was tested with the same membranes and experimental conditions as mentioned above. The increase in TR-FRET signal (HTRF ratio) generated by stimulation with the agonist indicates that the proportion of the G-protein alpha form bound to the donor GTP increases (i.e. the empty form of G-protein alpha decreases). Thus, the GPCR receptor activated by its agonist leads to binding of the donor GTP to the G-protein, which then changes to the donor GTP form and leads to an increase in the TR-FRET signal. These results are shown in FIG. 26B.

Sequence Listing

TABLE 3

| Sequence number | Type of sequences | Amino acid sequence |
|---|---|---|
| SEQ ID NO: 1 | VH-CDR1 | GFNIKDYY |
| SEQ ID NO: 2 | VH-CDR2 | IDPENGNT |
| SEQ ID NO: 3 | VH-CDR3 | TRGGGYYSDWYFDV |
| SEQ ID NO: 4 | VL-CDR1 | SSVSY |
| SEQ ID NO: 5 | VL-CDR3 | QQWSSNPPIT |
| SEQ ID NO: 6 | VH-FR1 | EVQLQQSGAELVRPGALVKLSCKAS |
| SEQ ID NO: 7 | VH-FR2 | MHWVKQRPEQGLEWIGW |

TABLE 3-continued

| Sequence number | Type of sequences | Amino acid sequence |
|---|---|---|
| SEQ ID NO: 8 | VH-FR3 | IYDPKFQGKASITADTSSNTAYLQLSS LTSEDTAVYYC |
| SEQ ID NO: 9 | VH-FR4 | WGAGTTVTVSS |
| SEQ ID NO: 10 | VL-FR1 | QIVLTQSPAIMSASPGEKVTMTCSAS |
| SEQ ID NO: 11 | VL-FR2 | MHWYQQKSGTSPKRWIY |
| SEQ ID NO: 12 | VL-FR3 | KLASGVPARFSGSGSGTSYSLTISSME AEDAATYYC |
| SEQ ID NO: 13 | VL-FR4 | FGAGTKLELK |
| SEQ ID NO: 14 | VH | EVQLQQSGAELVRPGALVKLSCKASG FNIKDYYMHWVKQRPEQGLEWIGWI DPENGNTIYDPKFQGKASITADTSSN TAYLQLSSLTSEDTAVYYCTRGGGYY SDWYFDVWGAGTTVTVSS |
| SEQ ID NO: 15 | VL | QIVLTQSPAIMSASPGEKVTMTCSAS SSVSYMHWYQQKSGTSPKRWIYDTS KLASGVPARFSGSGSGTSYSLTISSM EAEDAATYYCQQWSSNPPITFGAGT KLELK |

References Cited

[1] Damien Maurel, *Oligomérisation des récepteurs couplés aux protéins G: deux ou plus? Application des technologies de FRET en temps résolu au cas du récepteur GABAB*. Biologie cellulaire. Université Montpellier I, 2006.

[2] Atwood et al., BMC Genomics, 2011, 12:14

JOINT RESEARCH AGREEMENT

The presently claimed invention was made by, or on behalf of, one or more parties to a joint research agreement within the meaning of 35 U.S.C. 100(h) and 37 CFR 1.9(e). The parties to the joint research agreement are CISBIO BIOASSAYS and CENTRE NATIONAL DE LA RECHERCHE SCIENTIFIQUE. The joint research agreement was in effect on or before the effective filing date of the claimed invention, and the claimed invention was made as a result of activities undertaken within the scope of the agreement.

The invention claimed is:

1. An antibody or antibody fragment capable of binding to G-protein alpha, which comprises:
   a heavy chain variable domain comprising a CDR1 of amino acid sequence SEQ ID NO: 1, a CDR2 of amino acid sequence SEQ ID NO: 2, and a CDR3 of amino acid sequence SEQ ID NO: 3; and
   a light chain variable domain comprising a CDR1 of amino acid sequence SEQ ID NO: 4, a CDR2 of amino acid sequence DTS, and a CDR3 of the light chain variable domain consists of the amino acid sequence SEQ ID NO: 5.

2. The antibody or antibody fragment as claimed in claim 1, in which:
   the heavy chain variable domain comprises an FR1 having at least 80% homology with the amino acid sequence SEQ ID NO: 6, an FR2 having at least 80% homology with the amino acid sequence SEQ ID NO:

7, an FR3 having at least 80% homology with the amino acid sequence SEQ ID NO: 8, an FR4 having at least 80% homology with the amino acid sequence SEQ ID NO: 9; and the light chain variable domain comprises an FR1 having at least 80% homology with the amino acid sequence SEQ ID NO: 10, an FR2 having at least 80% homology with the amino acid sequence SEQ ID NO: 11, an FR3 having at least 80% homology with the amino acid sequence SEQ ID NO: 12, an FR4 having at least 80% homology with the amino acid sequence SEQ ID NO: 13.

3. The antibody or antibody fragment of claim 1, in which:

the heavy chain variable domain has at least 80% homology with the amino acid sequence SEQ ID NO: 14;
the light chain variable domain has at least 80% homology with the amino acid sequence SEQ ID NO: 15; and
CDR1 of the heavy chain variable domain consists of the amino acid sequence SEQ ID NO: 1, CDR2 of the heavy chain variable domain consists of the amino acid sequence SEQ ID NO: 2, CDR3 of the heavy chain variable domain consists of the amino acid sequence SEQ ID NO: 3, CDR1 of the light chain variable domain consists of the amino acid sequence SEQ ID NO: 4, CDR2 of the light chain variable domain consists of the amino acid sequence DTS, and CDR3 of the light chain variable domain consists of the amino acid sequence SEQ ID NO: 5.

4. The antibody or antibody fragment of claim 1, in which the heavy chain variable domain consists of the amino acid sequence SEQ ID NO: 14 and the light chain variable domain consists of the amino acid sequence SEQ ID NO: 15.

5. The antibody or antibody fragment of claim 1, in which the antibody or antibody fragment is labeled with a member of a pair of RET partners.

6. The antibody or antibody fragment as claimed in claim 5, in which the member of a pair of RET partners is (i) a fluorescent donor compound or a luminescent donor compound, or (ii) a fluorescent acceptor compound or a nonfluorescent acceptor compound.

7. The antibody or antibody fragment of claim 5, in which:

the member of a pair of RET partners is a fluorescent acceptor compound selected from allophycocyanins, rhodamines, cyanins, squaraines, coumarins, proflavins, acridines, fluoresceins, boron-dipyrromethene derivatives, nitrobenzoxadiazole and a quantum dot, GFP, GFP variants selected from GFP10, GFP2 and eGFP, YFP, YFP variants selected from eYFP, YFP topaz, YFP citrine, YFP venus and YPet, mOrange and DsRed; or the member of a pair of RET partners is a fluorescent donor compound selected from: a europium cryptate, a europium chelate, a terbium chelate, a terbium cryptate, a ruthenium chelate, a quantum dot, allophycocyanins, rhodamines, cyanins, squaraines, coumarins, proflavins, acridines, fluoresceins, boron-dipyrromethene derivatives and nitrobenzoxadiazole; or the member of a pair of RET partners is a luminescent donor compound selected from: Luciferase (luc), *Renilla* Luciferase (Rluc), the variants of *Renilla* Luciferase (Rluc8) and Firefly Luciferase.

8. A composition comprising an antibody or an antibody fragment as claimed in claim 1.

9. A nucleic acid sequence coding for an antibody or an antibody fragment as claimed in claim 1.

10. A vector comprising the nucleic acid sequence as claimed in claim 9.

11. A cell comprising the vector as claimed in claim 10.

12. A cell comprising the nucleic acid sequence as claimed in claim 9.

13. A kit comprising (i) an antibody or an antibody fragment as claimed in claim 1 and (ii) nonhydrolyzable or slowly hydrolyzable GTP labeled with a member of a pair of RET partners.

14. The kit as claimed in claim 13, in which the labeled nonhydrolyzable or slowly hydrolyzable GTP is labeled with:

a fluorescent donor compound; or
a fluorescent acceptor compound, or a nonfluorescent acceptor compound.

15. The kit as claimed in claim 14, wherein the fluorescent donor compound is chosen from GTP-gamma-N-C2, GTP-gamma-N-C3, GTP-gamma-N-octyl-C2, GTP-gamma-N-octyl-C11, GTP-gamma-N-octyl-C3, GTP-gamma-O-hexyl-C2, GTP-gamma-O-hexyl-C3 or GTP-gamma-N-octyl-thiosuccinimidyl-C2.

16. The kit as claimed in claim 14, wherein the fluorescent acceptor compound is chosen from GTPgN-octyl-Cy5, GTPgN-octyl-AF488, GTPgN-L15-Fluorescein, GTPgO-Linker-Cy5 (P) or GTPgS-Linker-Cy5 (R).

17. The kit as claimed in claim 14, wherein the nonfluorescent acceptor compound is a quencher.

18. The kit as claimed in claim 13, wherein the GTP is chosen from GTPγS, GTPgS, GppNHp or GppCp.

* * * * *

SEQUENCE LISTING

```
<160> NUMBER OF SEQ ID NOS: 15

<210> SEQ ID NO 1
<211> LENGTH: 8
<212> TYPE: PRT
<213> ORGANISM: Artificial Sequence
<220> FEATURE:
<223> OTHER INFORMATION: VH-CDR1

<400> SEQUENCE: 1

Gly Phe Asn Ile Lys Asp Tyr Tyr
1               5

<210> SEQ ID NO 2
<211> LENGTH: 8
<212> TYPE: PRT
<213> ORGANISM: Artificial Sequence
<220> FEATURE:
<223> OTHER INFORMATION: VH-CDR2

<400> SEQUENCE: 2

Ile Asp Pro Glu Asn Gly Asn Thr
1               5

<210> SEQ ID NO 3
<211> LENGTH: 14
<212> TYPE: PRT
```

<213> ORGANISM: Artificial Sequence
<220> FEATURE:
<223> OTHER INFORMATION: VH-CDR3

<400> SEQUENCE: 3

Thr Arg Gly Gly Gly Tyr Tyr Ser Asp Trp Tyr Phe Asp Val
1               5                   10

<210> SEQ ID NO 4
<211> LENGTH: 5
<212> TYPE: PRT
<213> ORGANISM: Artificial Sequence
<220> FEATURE:
<223> OTHER INFORMATION: VL-CDR1

<400> SEQUENCE: 4

Ser Ser Val Ser Tyr
1               5

<210> SEQ ID NO 5
<211> LENGTH: 10
<212> TYPE: PRT
<213> ORGANISM: Artificial Sequence
<220> FEATURE:
<223> OTHER INFORMATION: VL-CDR3

<400> SEQUENCE: 5

Gln Gln Trp Ser Ser Asn Pro Pro Ile Thr
1               5                   10

<210> SEQ ID NO 6
<211> LENGTH: 25
<212> TYPE: PRT
<213> ORGANISM: Artificial Sequence
<220> FEATURE:
<223> OTHER INFORMATION: VH-FR1

<400> SEQUENCE: 6

Glu Val Gln Leu Gln Gln Ser Gly Ala Glu Leu Val Arg Pro Gly Ala
1               5                   10                  15

Leu Val Lys Leu Ser Cys Lys Ala Ser
            20                  25

<210> SEQ ID NO 7
<211> LENGTH: 17
<212> TYPE: PRT
<213> ORGANISM: Artificial Sequence
<220> FEATURE:
<223> OTHER INFORMATION: VH-FR2

<400> SEQUENCE: 7

Met His Trp Val Lys Gln Arg Pro Glu Gln Gly Leu Glu Trp Ile Gly
1               5                   10                  15

Trp

<210> SEQ ID NO 8
<211> LENGTH: 38
<212> TYPE: PRT
<213> ORGANISM: Artificial Sequence
<220> FEATURE:
<223> OTHER INFORMATION: VH-FR3

<400> SEQUENCE: 8

Ile Tyr Asp Pro Lys Phe Gln Gly Lys Ala Ser Ile Thr Ala Asp Thr
1               5                   10                  15

Ser Ser Asn Thr Ala Tyr Leu Gln Leu Ser Ser Leu Thr Ser Glu Asp
            20                  25                  30

Thr Ala Val Tyr Tyr Cys
        35

<210> SEQ ID NO 9
<211> LENGTH: 11
<212> TYPE: PRT
<213> ORGANISM: Artificial Sequence
<220> FEATURE:
<223> OTHER INFORMATION: VH-FR4

<400> SEQUENCE: 9

Trp Gly Ala Gly Thr Thr Val Thr Val Ser Ser
1               5                   10

<210> SEQ ID NO 10
<211> LENGTH: 26
<212> TYPE: PRT
<213> ORGANISM: Artificial Sequence
<220> FEATURE:
<223> OTHER INFORMATION: VL-FR1

<400> SEQUENCE: 10

Gln Ile Val Leu Thr Gln Ser Pro Ala Ile Met Ser Ala Ser Pro Gly
1               5                   10                  15

Glu Lys Val Thr Met Thr Cys Ser Ala Ser
            20                  25

<210> SEQ ID NO 11
<211> LENGTH: 17
<212> TYPE: PRT
<213> ORGANISM: Artificial Sequence
<220> FEATURE:
<223> OTHER INFORMATION: VL-FR2

<400> SEQUENCE: 11

Met His Trp Tyr Gln Gln Lys Ser Gly Thr Ser Pro Lys Arg Trp Ile
1               5                   10                  15

Tyr

<210> SEQ ID NO 12
<211> LENGTH: 36
<212> TYPE: PRT
<213> ORGANISM: Artificial Sequence
<220> FEATURE:
<223> OTHER INFORMATION: VL-FR3

<400> SEQUENCE: 12

Lys Leu Ala Ser Gly Val Pro Ala Arg Phe Ser Gly Ser Gly Ser Gly
1               5                   10                  15

Thr Ser Tyr Ser Leu Thr Ile Ser Ser Met Glu Ala Glu Asp Ala Ala
            20                  25                  30

Thr Tyr Tyr Cys
        35

<210> SEQ ID NO 13
<211> LENGTH: 10
<212> TYPE: PRT
<213> ORGANISM: Artificial Sequence
<220> FEATURE:
<223> OTHER INFORMATION: VL-FR4

<400> SEQUENCE: 13

```
Phe Gly Ala Gly Thr Lys Leu Glu Leu Lys
1               5                   10

<210> SEQ ID NO 14
<211> LENGTH: 121
<212> TYPE: PRT
<213> ORGANISM: Artificial Sequence
<220> FEATURE:
<223> OTHER INFORMATION: Variable domain of the heavy chain (VH)

<400> SEQUENCE: 14

Glu Val Gln Leu Gln Gln Ser Gly Ala Glu Leu Val Arg Pro Gly Ala
1               5                   10                  15

Leu Val Lys Leu Ser Cys Lys Ala Ser Gly Phe Asn Ile Lys Asp Tyr
                20                  25                  30

Tyr Met His Trp Val Lys Gln Arg Pro Glu Gln Gly Leu Glu Trp Ile
            35                  40                  45

Gly Trp Ile Asp Pro Glu Asn Gly Asn Thr Ile Tyr Asp Pro Lys Phe
        50                  55                  60

Gln Gly Lys Ala Ser Ile Thr Ala Asp Thr Ser Asn Thr Ala Tyr
65                  70                  75                  80

Leu Gln Leu Ser Ser Leu Thr Ser Glu Asp Thr Ala Val Tyr Tyr Cys
                85                  90                  95

Thr Arg Gly Gly Gly Tyr Tyr Ser Asp Trp Tyr Phe Asp Val Trp Gly
            100                 105                 110

Ala Gly Thr Thr Val Thr Val Ser Ser
            115                 120

<210> SEQ ID NO 15
<211> LENGTH: 107
<212> TYPE: PRT
<213> ORGANISM: Artificial Sequence
<220> FEATURE:
<223> OTHER INFORMATION: Light Chain Variable Domain (VL)

<400> SEQUENCE: 15

Gln Ile Val Leu Thr Gln Ser Pro Ala Ile Met Ser Ala Ser Pro Gly
1               5                   10                  15

Glu Lys Val Thr Met Thr Cys Ser Ala Ser Ser Ser Val Ser Tyr Met
                20                  25                  30

His Trp Tyr Gln Gln Lys Ser Gly Thr Ser Pro Lys Arg Trp Ile Tyr
            35                  40                  45

Asp Thr Ser Lys Leu Ala Ser Gly Val Pro Ala Arg Phe Ser Gly Ser
        50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys Gln Gln Trp Ser Ser Asn Pro Pro Ile
                85                  90                  95

Thr Phe Gly Ala Gly Thr Lys Leu Glu Leu Lys
            100                 105
```